US012800854B2

(12) United States Patent
Cok et al.

(10) Patent No.: US 12,800,854 B2
(45) Date of Patent: Nov. 17, 2026

(54) TRANSFER-PRINTED MICRO-OPTICAL COMPONENTS

(71) Applicant: X-Celeprint Limited, Dublin (IE)

(72) Inventors: Ronald S. Cok, Rochester, NY (US); Wilfried Noell, Neuchâtel (CH); David Gomez, Holly Springs, NC (US); Ruggero Loi, Selargius (IT)

(73) Assignee: X-Celeprint Limited, Dublin (IE)

( * ) Notice: Subject to any disclaimer, the term of this patent is extended or adjusted under 35 U.S.C. 154(b) by 574 days.

(21) Appl. No.: 18/062,844

(22) Filed: Dec. 7, 2022

(65) Prior Publication Data

US 2024/0118489 A1 Apr. 11, 2024

Related U.S. Application Data

(60) Provisional application No. 63/414,423, filed on Oct. 7, 2022.

(51) Int. Cl.
*G02B 6/12* (2006.01)
*G02B 6/138* (2006.01)
(Continued)

(52) U.S. Cl.
CPC ....... *G02B 6/4244* (2013.01); *G02B 6/12004* (2013.01); *G02B 6/138* (2013.01);
(Continued)

(58) Field of Classification Search
CPC .. G02B 6/4244; G02B 6/12004; G02B 6/138; G02B 6/4214; G02B 7/003;
(Continued)

(56) References Cited

U.S. PATENT DOCUMENTS 8,722,458 B2 5/2014 Rogers et al.
9,358,775 B2 6/2016 Bower et al.
(Continued)

FOREIGN PATENT DOCUMENTS

WO WO-2011133518 A1 * 10/2011 .............. C09J 11/00
WO WO-2024/074715 A1 4/2024

OTHER PUBLICATIONS

International Search Report for PCT/EP2023/077794, 4 pages, (mailed Feb. 22, 2024).
(Continued)

*Primary Examiner* — William R Alexander
*Assistant Examiner* — Alaina Marie Swanson
(74) *Attorney, Agent, or Firm* — Choate, Hall & Stewart LLP; Michael D. Schmitt

(57) ABSTRACT

An exemplary micro-optical component includes a micro-substrate and a micro-optical element disposed on the micro-substrate. The micro-optical element is structured to modify or process light. At least a portion of a component tether is physically attached to the micro-substrate or physically attached to the micro-optical element. The micro-optical component has a thickness less than 250 μm. Light can be processed by reflection, refraction, diffraction, frequency changes, polarization changes, color-temperature or frequency distribution changes, or phase changes. The micro-optical component can be disposed on a system substrate to form a micro-optical system. The system substrate can include a cavity and the micro-optical element can be disposed at least partially in the cavity. Micro-optical components can be passive optical micro-devices. A light-active element can be disposed on the micro-substrate to receive light from or emit light to the micro-optical element.

22 Claims, 31 Drawing Sheets

(51) Int. Cl.
*G02B 6/42* (2006.01)
*G02B 7/00* (2021.01)

(52) U.S. Cl.
CPC .. *G02B 6/4214* (2013.01); *G02B 2006/12085* (2013.01); *G02B 2006/12173* (2013.01); *G02B 2006/12176* (2013.01); *G02B 7/003* (2013.01)

(58) Field of Classification Search
CPC ........... G02B 2006/12085; G02B 2006/12173; G02B 2006/12176; G02B 27/32; G02B 6/4224
USPC .......................................................... 359/831
See application file for complete search history.

(56) References Cited

U.S. PATENT DOCUMENTS

| | | | | |
|---|---|---|---|---|
| 9,362,113 | B2 | 6/2016 | Meitl et al. | |
| 9,704,821 | B2 | 7/2017 | Meitl et al. | |
| 10,109,753 | B2 | 10/2018 | Bower et al. | |
| 10,199,546 | B2 | 2/2019 | Cok et al. | |
| 10,317,624 | B1 * | 6/2019 | Ogden | G02B 6/425 |
| 10,361,180 | B2 | 7/2019 | Rogers et al. | |
| 10,424,572 | B2 | 9/2019 | Rogers et al. | |
| 10,504,882 | B2 | 12/2019 | Rogers et al. | |
| 10,714,374 | B1 | 7/2020 | Cok et al. | |
| 10,782,002 | B2 | 9/2020 | Bower et al. | |
| 11,137,641 | B2 | 10/2021 | Cok et al. | |
| 2010/0068653 | A1 * | 3/2010 | Fujisawa | G02B 6/138 430/321 |
| 2010/0289161 | A1 * | 11/2010 | Yamada | B29C 37/005 425/149 |
| 2013/0235184 | A1 * | 9/2013 | Shih | G02B 30/25 348/95 |
| 2016/0093600 | A1 * | 3/2016 | Bower | H01L 25/0753 257/89 |
| 2017/0133818 | A1 | 5/2017 | Cok | |
| 2019/0051552 | A1 * | 2/2019 | Bower | H01L 21/6835 |
| 2019/0204506 | A1 * | 7/2019 | Becker | G02B 6/1221 |
| 2020/0049906 | A1 * | 2/2020 | Budd | G02B 6/4214 |
| 2020/0176670 | A1 | 6/2020 | Gomez et al. | |
| 2020/0286747 | A1 * | 9/2020 | Trindade | B81C 3/008 |
| 2021/0197507 | A1 | 7/2021 | Lan et al. | |
| 2021/0407959 | A1 * | 12/2021 | Marcoccia | B41F 16/0046 |
| 2022/0107077 | A1 * | 4/2022 | Gronenborn | G02B 3/0087 |
| 2022/0181185 | A1 | 6/2022 | Loi | |
| 2022/0285309 | A1 | 9/2022 | Cok et al. | |

OTHER PUBLICATIONS

Written Opinion for PCT/EP2023/077794, 14 pages, (mailed Feb. 22, 2024).

* cited by examiner

TRANSFER-PRINTED MICRO-OPTICAL COMPONENTS

PRIORITY APPLICATION

This application claims the benefit of U.S. Provisional Patent No. 63/414,423 filed on Oct. 7, 2022, the disclosure of which is hereby incorporated by reference herein in its entirety.

TECHNICAL FIELD

This disclosure relates generally to transfer printable micro-optical components.

BACKGROUND

Photonic systems use light-sensing, light-emitting, and light-modifying components to manipulate light (e.g., photons), typically for applications in telecommunications. Such systems often rely on integrated circuits using compound semiconductors to efficiently generate and amplify light, for example using lasers and optical amplifiers. The generated light can be modulated, for example with salts such as lithium niobate, and detected, for example with photodiodes having a semiconductor p-n junction that produces electrical current in response to light exposure. Light can also be directed, for example using wave guides or light pipes constructed with materials such as silicon nitride, or optical elements that are substantially transparent at a desired wavelength of light corresponding to emitted, modified, or detected light.

Modern silicon wafers are processed at a very high resolution, for example having features that are 10 nm or less in extent or having features that are separated by 10 nm or less, or both, to make dense and fast integrated circuits. Such small features sizes are a result of expensive photolithographic tools whose cost is justified in terms of the very large volumes of silicon integrated circuits, for example CMOS circuits, that can be processed by the tools. The very large volume of silicon integrated circuits has, in turn, led to the development of low-cost and relatively large source silicon wafers, for example 300 mm in diameter. The combination of low-cost and large silicon source materials and sophisticated process equipment (particularly high-resolution mask and exposure equipment) enables the low cost and ubiquitous silicon integrated circuits that are present in most electronic devices today.

However, silicon is not the optimal material for all desirable semiconductor devices and functions. For example, compound semiconductor materials, such as InP, GaAs, and GaN and many other III/V material combinations, can provide, for example, greater electron mobility, superior light emission, or superior sensor sensitivity and are therefore more suitable for certain applications, such as high-power electrical devices and photonic devices (e.g., lasers and light-emitting diodes) among others. Because these applications are often relatively recently developed and are manufactured at a relatively lower volume than silicon devices, the availability and cost of photolithographic processing equipment and wafer sizes for compound semiconductor materials is disadvantaged with respect to silicon. Essentially, compound semiconductor materials and processing are more expensive and are manufactured at lower resolutions (making larger and more expensive compound semiconductor components) than silicon. In some systems, photonic components are controlled by silicon circuits, for example CMOS circuits.

Optical elements, such as reflectors, refractors, or diffractors are also useful in photonic systems. Conventional optical elements can be too large for miniaturized optical and photonic systems. There is a need therefore, for structures, systems, and methods for small, high-resolution compound semiconductor devices, silicon devices, and optical elements for photonic and optical systems.

SUMMARY

The present disclosure provides, inter alia, devices, structures, systems, and construction methods for micro-optical elements, micro-optical components, and micro-optical systems. The devices, structures, or systems can include light emitters, light detectors, light processors, light modifiers, and light transmitters such as lasers, photodiodes, phototransistors, optical modulators, optical amplifiers, and optical wave guides. Such micro-optical structures are useful in photonic systems, such as photonic integrated circuits that combine electrical integrated circuits (e.g., silicon circuits such as CMOS) with optical emitters (such as light-emitting diodes or LEDs and lasers), optical sensors (such as photodiodes) and optical structures (such as mirrors, partial mirrors, prisms, lenses, filters, diffusers, beam-shaping optics, and gratings) that provide one or more of reflection, refraction, polarization detection or modification, filters, or diffraction to light (e.g., photons), thereby processing or modifying the photons. Embodiments of the present disclosure can also comprise wave guides or light pipes for transmitting photons from one location to another.

According to embodiments of the present disclosure, a micro-optical component comprises a micro-substrate having a micro-substrate area and a micro-optical element disposed on the micro-substrate. The micro-optical element can be a passive optical component that modifies photons or one or more photon attributes but is not electrically active. At least a portion of a component tether can be physically attached to the micro-substrate or is physically attached to the micro-optical element. The component tether can be whole, e.g., for a micro-optical component on a component source wafer, or broken (e.g., fractured), or separated, e.g., for a micro-optical component micro-transfer printed to a system substrate.

The micro-optical component can have a thickness (e.g., a height or a depth or both) no greater than 250 μm (e.g., less than 250 μm, no greater than 200 μm, no greater than 150 μm, no greater than 100 μm, no greater than 75 μm, no greater than 50 μm, no greater than 25 μm, or no greater than 10 μm). A thickness, height, or depth of a micro-optical element can be the combined height, depth, or thickness of a micro-substrate and a micro-optical element together in a direction orthogonal to a micro-substrate surface on which the micro-optical element is disposed. The micro-optical element can have a micro-optical element area over the micro-substrate and the micro-substrate area can be greater than the micro-optical element area the micro-substrate area can be equal to the micro-optical element area, or the micro-substrate area can be smaller than the micro-optical element area. In some embodiments, the micro-substrate extends beyond a micro-optical element in only one dimension, e.g., in a direction parallel to the micro-substrate surface. In some embodiments, the micro-substrate extends beyond the micro-optical element in two dimensions, e.g., in orthogonal directions parallel to the micro-substrate surface.

According to embodiments of the present disclosure, the micro-optical element can be a reflection element, a refraction element, a diffraction element, a frequency filter, a phase-change element, a polarization detector, a polarization modifier (e.g., a polarization rotator or a polarization filter), a filter, a frequency converter, or any combination thereof. In some embodiments, the micro-optical element is a lens or a prism. The micro-optical element can be disposed on the micro-substrate surface or formed in the micro-substrate. The micro-optical element can extend away from the micro-substrate in a direction perpendicular to the micro-substrate surface.

In some embodiments, a micro-optical component comprises a light-active element, for example an electrically active light-generating, light-modifying, or light-responsive element (e.g., a light-active element that generates, responds to, or modifies light in combination with received or generated electrical signals, e.g., a light-active component) disposed on the micro-substrate on a side of the micro-substrate opposite the micro-optical element. For example, the micro-optical element can be disposed on a first surface or first side of the micro-substrate and the light-active element can be disposed on a second surface or second side of the micro-substrate opposite and substantially parallel to the first surface or first side of the micro-substrate. The light-active element can send light to or receive light from the micro-optical element. A light-generating element can be a laser or light-emitting diode, a light-responsive element can be a photodiode or phototransistor, and a light-modifying element can be an optical amplifier or an optical modulator. In some embodiments, the micro-substrate comprises a micro-alignment mark disposed in the micro-substrate area exclusive of the micro-optical element area. The micro-substrate can be substantially transparent to light modified by the micro-optical element, the micro-substrate can be substantially reflective to light modified by the micro-optical element, or the micro-substrate can be substantially opaque to or absorb light modified by the micro-optical element or stray or ambient light.

In some embodiments of the present disclosure, the micro-substrate and the micro-optical element are unitary. For example, the micro-optical component can be monolithic and can comprise a common material made in a common construction or manufacturing step, for example by imprinting, two-photon polymerization, or photolithography.

In some embodiments, the micro-substrate and the micro-optical element comprise different materials, the micro-substrate and the micro-optical element comprise different structures adhered together, or both, and consequently are not unitary or monolithic. In some embodiments of the present disclosure, the micro-substrate has a micro-substrate area defined by the micro-substrate length times the micro-substrate width of no greater than 100,000 $\mu m^2$ (e.g., no greater than 62,500 $\mu m^2$, less than 62,500 $\mu m^2$, no greater than 40,000 $\mu m^2$, less than 40,000 $\mu m^2$, no greater than 20,000 $\mu m^2$, no greater than 10,000 $\mu m^2$, no greater than 2,500 $\mu m^2$, no greater than 400 $\mu m^2$, or no greater than 100 $\mu m^2$). In some embodiments, the micro-substrate has a large aspect ratio (length to width), for example no less than 2:1, no less than 4:1, no less than 5:1, no less than 8:1, or no less than 10:1. In some embodiments, the micro-substrate has a width of no greater than 50 μm and a length of no less than 100 μm, 200 μm, 250 μm, or 500 μm or a width of no greater than 100 μm and a length of no less than 500 μm, 750 μm, or 1000 μm. In some embodiments, the micro-substrate has a width of no greater than 200 μm and a length of no less than 400 μm, 600 μm, 800 μm, 1000 μm, 1200 μm, 1400 μm, 1600 μm, 1800 μm, or 2000 μm.

According to embodiments of the present disclosure, a micro-optical component comprises a protective layer or protective layers. The protective layer or layers can be constructed to desirably interact with light.

In some embodiments, the component tether comprises a portion of the protective layer. In some embodiments, the component tether is a hybrid organic-inorganic tether.

According to embodiments of the present disclosure, a micro-optical system comprises a system substrate and a micro-optical component disposed on the system substrate. The micro-optical component can be non-native to the system substrate. In some embodiments, the micro-optical element extends in a direction away from the system substrate. In some embodiments, the micro-optical system comprises a wave guide or light pipe disposed on or in the system substrate and in optical communication with the micro-optical element. In some embodiments, the system substrate comprises a cavity and the micro-optical element is at least partially disposed in the cavity.

In some embodiments, the micro-substrate is disposed in the cavity. In some embodiments either or both of the micro-optical element and the micro-substrate are adhered to a surface (e.g., side or floor) of the cavity, for example with an adhesive such as an optically clear adhesive or an optical-index matching adhesive. Some embodiments comprise a light pipe disposed in or on the system substrate disposed to transmit light into or out of the micro-optical element. In some embodiments, a micro-optical component comprises a light-active element disposed on the micro-substrate on a side of the micro-substrate opposite the micro-optical element, the system substrate is a semiconductor substrate, and the semiconductor substrate comprises an electronic circuit electrically connected to the light-active element. The electronic circuit can electrically control or respond to the light-active element.

In some embodiments of the present disclosure, the system substrate comprises a micro-alignment mark disposed on or in a surface of the system substrate. The micro-alignment mark can be disposed on or in the surface of the system substrate in alignment with an alignment mark disposed in or on the micro-optical component, for example on the micro-substrate outside the micro-optical element area.

In some embodiments of the present disclosure, the micro-optical system is a photonic integrated circuit.

In some embodiments, the system substrate comprises a cavity and the micro-optical element is disposed at least partially in the cavity. In some embodiments, the micro-optical system comprises adhesive that adheres the micro-optical element to the micro-substrate or adheres the micro-optical component to the system substrate or to a wall or floor (bottom) of a cavity in the system substrate. In some embodiments, the micro-optical system comprises an optical-index-matching material (e.g., an optically clear adhesive) disposed on any of the micro-optical element, micro-substrate, or system substrate. An optical-index-matching material or adhesive can fill a gap between the micro-optical element and the micro-substrate, or between the micro-optical component (e.g., the micro-optical element) and the system substrate, for example in a cavity in the system substrate.

Thus, according to embodiments of the present disclosure, a cavity in a system substrate has one or more cavity sides (e.g., walls) extending into the system substrate and the micro-optical element is disposed in contact with one or more of the cavity sides. In some embodiments, the micro-optical element is disposed in the cavity but does not contact any of the cavity sides or floor. In some embodiments, the micro-optical element extends out of the cavity, for example above a surface of the system substrate. In some embodiments, the micro-substrate is disposed at least partially in the cavity. In some embodiments, the micro-substrate is disposed exclusively in the cavity. A surface of the micro-substrate can be substantially (e.g., within manufacturing tolerances) in a common plane with a surface of the system substrate. In some embodiments, the cavity has one or more cavity sides or walls extending into the system substrate and the micro-substrate is disposed in contact with one or more of the cavity sides or walls. In some embodiments, the cavity has a cavity floor (e.g., cavity bottom) in the system substrate and the micro-substrate is disposed in contact with the cavity floor, e.g., adhered to the cavity floor with an adhesive such as an optical-index matching adhesive.

In some embodiments of a micro-optical system according to the present disclosure, the system substrate comprises a structural (e.g., mechanical) stop disposed on a surface of the system substrate and the micro-optical component is in contact with or adhered to the structural stop. The structural stop can be formed, e.g., photolithographically, in or on the system substrate surface or can be a side (e.g., wall) of a cavity formed in the system substrate, for example by pattern-wise etching or imprinting the system substrate. The micro-substrate or the micro-optical element (or both) can be adjacent to, in contact with, or adhered to structural stop.

According to embodiments of the present disclosure, a micro-optical component source wafer comprises a source wafer comprising one or more sacrificial portions separated by one or more anchor portions and a micro-optical component disposed entirely and directly over each of the one or more sacrificial portions and physically attached to one of the one or more anchor portions by a tether.

According to embodiments of the present disclosure, a method of making a micro-optical system comprises providing a micro-optical component source wafer, providing a stamp, providing a system substrate, contacting the stamp to the micro-optical component, removing the micro-optical component from the micro-optical component source wafer with the stamp, contacting the micro-optical component to the system substrate with the stamp, and removing the stamp from the micro-optical component and the system substrate. In some embodiments, an adhesive layer is disposed on the system substrate and the micro-optical component contacted and adhered to the adhesive layer and system substrate.

According to embodiments of the present disclosure, a method of making a micro-optical system comprises providing a micro-optical component source wafer, providing a first stamp and a second stamp, providing a system substrate, contacting the first stamp to a first side of the micro-optical component, removing the micro-optical component from the micro-optical component source wafer with the first stamp, contacting the micro-optical component to a second side of the micro-optical component opposite the first side with the second stamp, contacting the first side of the micro-optical component to the system substrate with the second stamp, and removing the second stamp from the micro-optical component and the system substrate.

A method of making a system (e.g., a micro-optical system) according to the present disclosure can comprise providing a micro-optical component source wafer having one or more sacrificial portions separated by one or more anchor portions, coating at least a portion of the one or more sacrificial portions with a liquid curable polymer, forming a structure (e.g., a micro-optical component), wherein forming the structure comprises using two-photon polymerization to cure only a portion of the liquid curable polymer to form at least a portion of the structure, such as a micro-optical component, forming a component tether between the micro-optical component and one of the one or more anchor portions, and removing an uncured portion of the liquid curable polymer to form a gap between the structure and the component source wafer and make a micro-transfer-printable structure. In some embodiments, the sacrificial portion is a cavity and embodiments comprise disposing at least a portion of the liquid curable polymer in the cavity and curing only a portion of the liquid curable polymer in the cavity to form at least a portion of the structure (e.g., a micro-optical component) in the cavity. In some embodiments of the present disclosure, methods can comprise providing a micro-optical component source wafer comprising a cavity adjacent to one or more anchor portions, disposing at least a portion of a liquid curable polymer in the cavity, forming a structure (e.g., a micro-optical component), wherein forming the structure comprises using two-photon polymerization to cure only a portion of the liquid curable polymer to form at least a portion of the structure, forming a component tether between the structure and one of the one or more anchor portions, and removing an uncured portion of the liquid curable polymer (e.g., from the cavity).

According to embodiments of the present disclosure a method of making a system (e.g., a micro-optical system) can comprise providing a micro-optical component source wafer comprising one or more sacrificial portions separated by one or more anchor portions, coating at least a portion of the one or more sacrificial portions with a liquid curable polymer, forming a structure (e.g., a micro-optical component), wherein forming the structure comprises using imprint lithography to form at least a portion of the structure (e.g., a micro-optical component), and forming a component tether between the micro-optical component and one of the one or more anchor portions.

According to embodiments of the present disclosure a method of making a system (e.g., a micro-optical system) can comprise providing a micro-optical component source wafer comprising one or more sacrificial portions separated by one or more anchor portions, forming a mold in one of the one or more sacrificial portions, coating at least a portion of the sacrificial portions including the mold with a liquid curable polymer, forming a structure (e.g., a micro-optical component), wherein forming the structure comprises curing the liquid curable polymer, and forming a component tether between the structure and one of the one or more anchor portions. The mold can be made by etching a solid material in the sacrificial portion.

According to embodiments of the present disclosure a method of making a system (e.g., a micro-optical system) can comprise providing a micro-optical component source wafer comprising a cavity adjacent to an anchor portion, using imprint lithography to form a mold in the cavity, wherein using imprint lithography comprises coating the cavity with a liquid curable polymer and curing the liquid curable polymer, forming a structure (e.g., a micro-optical component), wherein forming the structure comprises disposing a material in the mold that is differentially etchable from the mold, forming a component tether between the micro-optical component and one of the anchor portions, and etching the cured polymer to release the transfer-printable structure. The cavity can be a sacrificial portion.

In some embodiments of the present disclosure, a micro-optical component comprises a micro-substrate having a micro-substrate area and a micro-optical element disposed on the micro-substrate area of the micro-substrate. The micro-optical element can have a micro-optical element area over the micro-substrate and the micro-substrate area can be greater than the micro-optical element area. According to embodiments of the present disclosure, the component tether can be made in a common step with forming the structure (e.g., micro-optical component) or can be made in additional deposition and processing (e.g., patterning) steps. In some embodiments, the component tether comprises tether portions made in a common step with forming the structure and comprises additional tether portions including different materials made using additional deposition and processing (e.g., patterning) steps, e.g., to make a hybrid tether comprising multiple, different materials, such as organic (e.g., polymer) and inorganic (e.g., silicon oxide or nitride) materials.

Methods described herein can be used to make micro-optical systems, but are not limited to such and can, for example, be used to make non-optical micro-systems. Structures of the present disclosure can be, in some embodiments, non-optical micro-components for example micro-transfer-printable non-optical micro-components having dimensions in the micron range, e.g., any combination of a height, width, or length less than or equal to 250 μm, less than 250 μm, no greater than 200 μm, no greater than 150 μm, no greater than 10 μm, no greater than 75 μm, no greater than 50 μm, no greater than 25 μm, or no greater than 10 μm.

In some embodiments, components of the present disclosure include a broken (e.g., fractured) or separated tether after the micro-optical component is printed to a component substrate, for example by micro-transfer printing.

Embodiments of the present disclosure provide micro-transfer-printable micro-optical components, systems, sources, and methods useful in highly integrated optical and photonic systems.

BRIEF DESCRIPTION OF THE DRAWINGS

Drawings are presented herein for illustration purposes, not for limitation. Drawings are not necessarily drawn to scale. The foregoing and other objects, aspects, features, and advantages of the disclosure will become more apparent and may be better understood by referring to the following description taken in conjunction with the accompanying drawings, in which.

DETAILED DESCRIPTION OF CERTAIN EMBODIMENTS

Figure 1B:
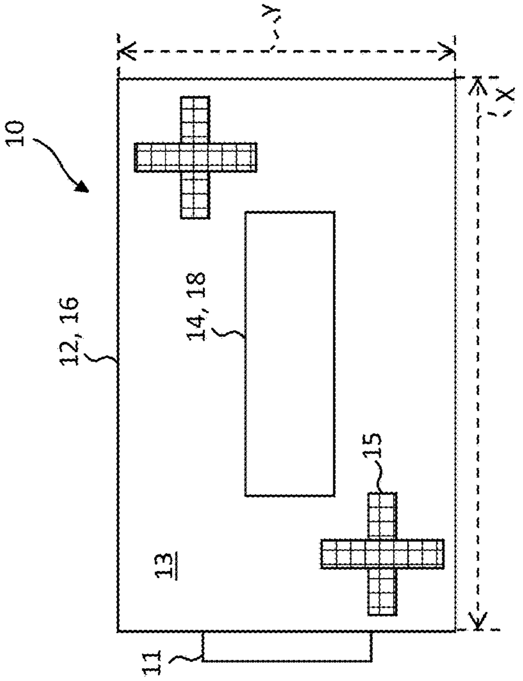
FIG. 1B is a plan view.

Certain embodiments of the present disclosure provide, inter alia, devices, structures, systems, and methods for micro-optical elements, micro-optical components, and micro-optical systems. Micro-optical structures are useful in photonic systems, such as photonic integrated circuits that combine electrical integrated circuits (e.g., silicon circuits such as CMOS) with optical emitters (such as light-emitting diodes and lasers), optical sensors (such as photodiodes and phototransistors), optical amplifiers, optical modulators, and passive optical structures (for example reflectors such as mirrors, partial mirrors, diffusers, and prisms, refractors, such as lenses, beam-shaping optics, filters, frequency converters, and diffractors, such as gratings) that provide reflection, refraction, diffraction, conversion, or filtering to photons, thereby redirecting, processing, or modifying the photons. Embodiments of the present disclosure can also comprise optical wave guides or light pipes for transmitting photons from one location to another. Photons propagating through free space (e.g., a vacuum or gas such as the atmosphere) or through a solid or liquid material having a constant optical index are also referred to herein as light, light rays, or light beams. Processed or modified light is light (e.g., photons, light rays, or light beams) whose direction, frequency, phase, frequency distribution, polarization, or propagation characteristics are changed, for example by reflection, refraction, conversion, filtering, or diffraction with an optical structure. Optical devices or structures interact with photons. Embodiments of the present disclosure provide micro-optical elements that are too small to construct and locate in photonic systems using known methods and material and can be used, therefore, to construct photonic systems that cannot be made using methods of the prior art.

Optical emitters, amplifiers, modulators, or sensors can comprise semiconductor components made with semiconductors such as silicon or compound semiconductors such as GaN, GaAs, or InP, or other light-sensitive materials such as lithium niobate using fabrication facilities and materials, for example compatible with silicon fabrication facilities. The semiconductors can comprise active circuits or devices, for example transistors, optical sensors, optical amplifiers, or optical light emitters such as lasers, light-emitting diodes (LEDs), or photodiodes. In some embodiments, the devices, structures, and systems disclosed herein comprise a silicon substrate or a silicon substrate comprising a silicon circuit. The silicon circuit can be connected to non-silicon semiconductor components to make a heterogeneous module, for example a light-control circuit, light-modifying circuit, or light-responsive circuit for light emitters or light responders.

Optical structures such as micro-optical elements of the present disclosure that modify light can comprise, for example, glass, polymers, or silicon. Micro-optical elements can be at least partially transparent (e.g., at least 50% transparent, at least 60% transparent, at least 70% transparent, at least 80% transparent, at least 90% transparent, or at least 95% transparent) to light of a desired frequency or frequencies, such as light modified, generated, or sensed by micro-optical elements, light emitters, or light sensors of the present disclosure. The optical structures can comprise multiple layers or coatings disposed on one or more surfaces of the optical structures, such as index-matching coatings, reflective coatings such as thin silver or aluminum layers, phase-change layers, polarization-sensitive layers, or anti-reflection layers. Light can be, for example, visible light, infrared light, ultraviolet light, any electromagnetic radiation having a frequency between 300 GHz and 3000 THz or a wavelength from 10 nm to 1000 μm, and generally any electromagnetic wave of any frequency that can be or is intentionally modified or otherwise processed with a micro-optical element. Substrates on which one or more micro-optical elements are disposed can be at least partially transparent (e.g., transparent) (e.g., at least 50% transparent, at least 60% transparent, at least 70% transparent, at least 80% transparent, at least 90% transparent, or at least 95% transparent) to light of a desired frequency or frequencies. In some embodiments, substrates on which one or more micro-optical elements are disposed can be at least partially reflective (e.g., reflective) (e.g., at least 50% reflective, at least 60% reflective, at least 70% reflective, at least 80% reflective, at least 90% reflective, or at least 95% reflective) to light of a desired frequency or frequencies. In some embodiments, substrates on which one or more micro-optical elements are disposed can be at least partially absorptive (e.g., opaque) (e.g., at least 50% absorptive, at least 60% absorptive, at least 70% absorptive, at least 80% absorptive, at least 90% absorptive, or at least 95% absorptive) to light of a desired frequency or frequencies.

According to embodiments of the present disclosure and as illustrated in FIGS. 1A-1D, a micro-optical component 10 comprises a micro-substrate 12 having a micro-substrate surface 13. A micro-optical element 14 structured to modify light 50 can be disposed on micro-substrate surface 13 of micro-substrate 12. Micro-substrate surface 13 can also be a side of micro-substrate 12 opposite micro-optical element 14, or refer to both sides (e.g., opposing sides) of micro-substrate 12 on or in at least one of which micro-optical element 14 is disposed or formed. Micro-substrate surface 13 can be a side of micro-substrate 12 used for handling micro-optical component 10, e.g., with a micro-transfer printing stamp 60 as discussed below. Micro-optical element 14 can be unitary with micro-substrate 12. Micro-optical element 14 can be adhered to micro-substrate surface 13, for example with an adhesive. In embodiments of the present disclosure, micro-substrate 12 provides a structure useful for enabling micro-transfer printing, especially where micro-optical element 14 can be difficult to handle (e.g., manipulate, dispose, position, or locate) in useful micro-systems. In some embodiments, micro-substrate 12 has a thickness (or height) less than a thickness (or height) of micro-optical element 14. In some embodiments, micro-substrate 12 has a thickness (or height) no greater than 20 μm, no greater than 10 μm, no greater than 5 μm, no greater than 4 μm, no greater than 2 μm, or no greater than 1 μm.

Micro-optical element 14 can be a passive optical structure that does not require external power (e.g., electrical power). Micro-optical component 10 can comprise at least a portion of a component tether 11 physically attached to micro-substrate 12 or physically attached to micro-optical element 14. Component tether 11 can be broken (e.g., fractured) or separated. Micro-optical component 10 can have a thickness H (e.g., a height or depth of micro-optical component 10) no greater than 250 μm (e.g., less than 250 μm, no greater than 200 μm, no greater than 150 μm, no greater than 100 μm, no greater than 75 μm, no greater than 50 μm, no greater than 25 μm, or no greater than 10 μm) in a direction D orthogonal to a surface of micro-substrate 12 on which micro-optical element 14 is disposed. Micro-optical components 10 having such a size or thickness are not readily or accurately micro-assembled into a micro-optical system using techniques of the prior art. Thus, embodiments of the present disclosure enable the precise micro-assembly of micro-optical components 10 in large volumes into photonic systems that are smaller and less expensive.

Figure 1D:
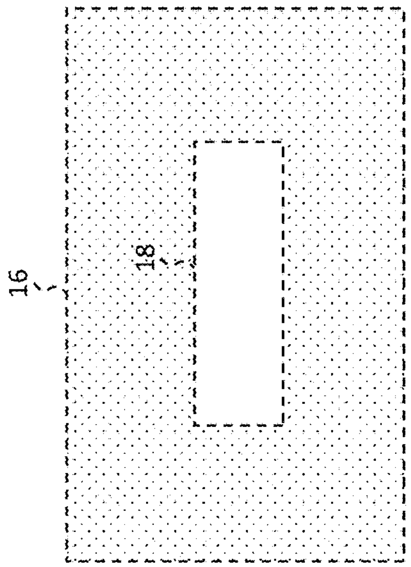
FIG. 1D is a plan view of the areas of a micro-substrate and micro-optical element corresponding to FIGS. 1A-1C according to illustrative embodiments of the present disclosure.

Micro-optical element 14 can have a micro-optical element area 18 on or over micro-substrate surface 13. Micro-substrate surface 13 can have a micro-substrate area 16 that is greater than micro-optical element area 18, as shown in FIG. 1B and FIG. 1D, so that micro-substrate 12 extends beyond micro-optical element 14 in a direction parallel to micro-substrate surface 13 to form an extension (e.g., a flange, ear, or flap) to micro-optical element 14 that can be used to hold micro-optical element 14 in place or to pick up or otherwise mechanically manipulate micro-optical element 14 without touching micro-optical element 14 itself (which can reduce impaired performance or damage to micro-optical element 14 that might occur from any mechanical manipulation of micro-optical component 10 or contact with micro-optical element 14). In some embodiments, micro-substrate area 16 is equal to or less than micro-optical element area 18. In some such embodiments, micro-optical component 10 can be picked up, held, or manipulated by contacting a side of micro-substrate 12 opposite micro-optical element 14. Micro-substrate 12 can have a micro-substrate area 16 no greater than 100,000 $\mu m^2$ (e.g., no greater than 62,500 $\mu m^2$, less than 62,500 $\mu m^2$, no greater than 40,000 $\mu m^2$, less than 40,000 $\mu m^2$, no greater than 20,000 $\mu m^2$, no greater than 10,000 $\mu m^2$, no greater than 2,500 $\mu m^2$, no greater than 400 $\mu m^2$, or no greater than 100 $\mu m^2$). In some embodiments, micro-substrate 12 has a large aspect ratio (length to width), for example no less than 2:1, no less than 4:1, no less than 5:1, no less than 8:1, or no less than 10:1. In some embodiments, micro-substrate 12 has a width of no greater than 50 μm and a length of no less than 100 μm, 200 μm, 250 μm, or 500 μm or a width of no greater than 100 μm and a length of no less than 200 μm, 500 μm, 750 μm, or 1000 μm. In some embodiments, micro-substrate 12 has a width of no greater than 200 μm and a length of no less than 400 μm, 600 μm, 800 μm, 1000 μm, 1200 μm, 1400 μm, 1600 μm, 1800 μm, or 2000 μm. Large-aspect ratio micro-substrates 12 can be useful, for example where light-active elements 20 (such as micro-lasers) have a large aspect ratio or where micro-optical element 14 has a large aspect ratio. Micro-optical components 10 with such small areas and/or large aspect ratios can be difficult or impossible to construct or assemble using techniques of the prior art. However, using structures and methods of the present disclosure, such micro-optical components 10 can be integrated into micro-optical systems 70 such as photonic systems or photonic integrated circuits, providing reduced size and cost with improved performance.

Micro-optical component 10 can comprise micro-alignment marks 15 (fiducial marks) disposed on or in micro-substrate 12 to assist in aligning micro-optical components 10 on a system substrate 40 in a micro-optical system 70, as discussed further below. Micro-substrate surface 13 can have a micro-substrate area 16 exclusive of micro-optical element area 18 that absorbs or diffuses stray light 50, for example to reduce unwanted reflections in a micro-optical system 70. Such an area of micro-substrate surface 13 can be black, for example coated with a light 50 absorbing material such as carbon black. Thus, micro-substrate 12 can have portions that are light-transparent or light-reflective and portions that are light-absorptive (e.g., light absorbing or light absorbent). In some embodiments, micro-substrate 12 can have portions that are light-transparent and other portions that are light-reflective. Patterned micro-substrates 12 can be made, for example, by pattern-wise material deposition such as evaporation of light-reflective or light-absorbing materials, for example using photolithographic, coating, or inkjet deposition methods.

In some embodiments of the present disclosure, micro-substrate 12 can transmit but does not intentionally modify (e.g., redirect or transform) light 50, in contrast to micro-optical element 14. In particular, in some embodiments, micro-substrate area 16 exclusive of micro-optical element area 18 is not intended to manipulate light 50 or otherwise modify light 50 and, in some embodiments, does not receive light 50. Those knowledgeable in optical design will appreciate that any real-world system is subject to ambient light 50 or unwanted light 50 reflection, or propagation and such light 50 can impinge on micro-substrate area 16 exclusive of micro-optical element area 18. To reduce such unwanted effects, micro-substrate area 16 exclusive of micro-optical element area 18 can absorb light 50, for example with a coating of a black material such as carbon black. In some embodiments, micro-optical element area 18 of micro-substrate 12 can be a portion of micro-optical element 14 (e.g., micro-optical element 14 can comprise the portion of micro-substrate 12 that is in micro-optical element area 18).

In some embodiments of the present disclosure, micro-substrate 12 can modify (e.g., redirect or transform) light 50, in combination with micro-optical element 14. For example, micro-substrate 12 can have a reflective coating 19 (or be reflective as shown in FIG. 7B), can refract light 50, can comprise phosphors or dyes that filter light 50, can comprise phosphors or quantum dots that absorb and re-emit light 50 as a light-frequency converter, or can comprise material that affects light 50 polarization (e.g., polymers with aligned molecules). Micro-substrate 12 can have substantially parallel opposing sides (e.g., as shown in the Figures) or can have opposing sides that are not parallel. Micro-substrate 12 can have substantially flat sides (e.g., micro-substrate surface 13, such as is shown in the Figures) or can have sides that are not flat or are structured.

Micro-optical element 14 can be a passive optical element that modifies light 50 by, for example, reflecting, partially reflecting, filtering, frequency converting, phase changing, polarization changing, refracting, or diffracting light 50 incident on micro-optical element 14, for example modifying a light ray, light beam, or photons 50 that intersect with micro-optical element 14, for example on an optical surface or face of micro-optical element 14. Micro-optical element 14 can be a mirror, partial mirror, or diffraction grating and can be coated with optical coatings such as anti-reflection coatings, to reduce unwanted optical effects, or can incorporate passive optical materials such as filters or multiple layers that filter desired frequencies of light 50 through optical interference. In some embodiments, micro-optical element 14 is a lens (e.g., a lenslet, that has optical power) or a prism. In some embodiments, micro-optical element 14 is a micro-lens, an array of micro-lenses, or comprises multiple micro-lenses. In some embodiments, micro-optical element 14 is an array of micro-optics (e.g., micro-lenses or micro-diffractive gratings). Micro-optical element 14 can comprise fluorescent or phosphorescent material coatings to absorb and re-emit light 50. Micro-optical element 14 can change the phase or frequency distribution, or both, of incident light 50. Micro-optical element 14 can be a light filter. Micro-optical element 14 can focus or defocus incident light 50. Micro-optical element 14 can be a Fresnel lens. In some embodiments, micro-optical element 14 can redirect light 50 from a direction parallel to micro-substrate surface 13 (horizontal) to a direction D orthogonal to micro-substrate surface 13 (vertical), for example as shown in FIG. 1C. In some embodiments, light 50 modified by micro-optical element 14 passes through micro-substrate 12 and micro-substrate 12 is substantially transparent to such light 50. For example, micro-substrate 12 can be no less than 50%, 75%, 80%, 85%, 90%, or 95% transparent to light 50 modified by micro-optical element 14 that passes through micro-substrate 12. In some embodiments, light 50 modified by micro-optical element 14 is substantially reflected by micro-substrate 12 and micro-substrate 12 is substantially reflective to such light 50. For example, micro-substrate 12 can be no less than 50%, 75%, 80%, 85%, 90%, or 95% reflective to light 50 modified by micro-optical element 14 incident upon micro-substrate 12. In some embodiments, micro-optical element 14 can redirect light 50 from a direction parallel to micro-substrate surface 13 to a different direction parallel to micro-substrate surface 13, e.g., in an orthogonal direction parallel to micro-substrate surface 13. In some embodiments, micro-optical element 14 can reflect incoming light 50 to a direction parallel and opposite to incoming light 50.

In the embodiments illustrated in FIGS. 1A-1D, micro-substrate 12 extends beyond micro-optical element 14 in two dimensions X and Y parallel to micro-substrate surface 13. In some embodiments and as illustrated in FIG. 2, micro-substrate 12 extends beyond micro-optical element 14 in only one dimension (direction X as shown) parallel to micro-substrate surface 13. By providing micro-substrate surface 13 extensions of micro-substrate 12 in only one dimension, micro-optical components 10 can be disposed closer together in photonic systems, e.g., closer together in a direction orthogonal to the direction of the micro-substrate surface 13 extensions.

Figure 1A:
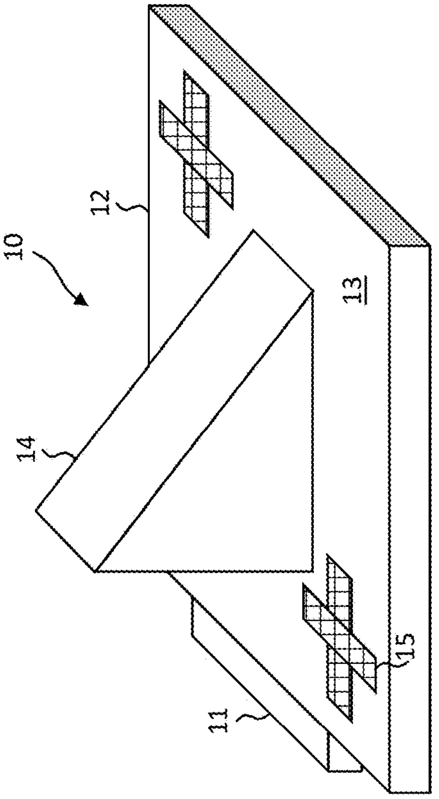
FIG. 1A is a perspective.
Figure 1C:
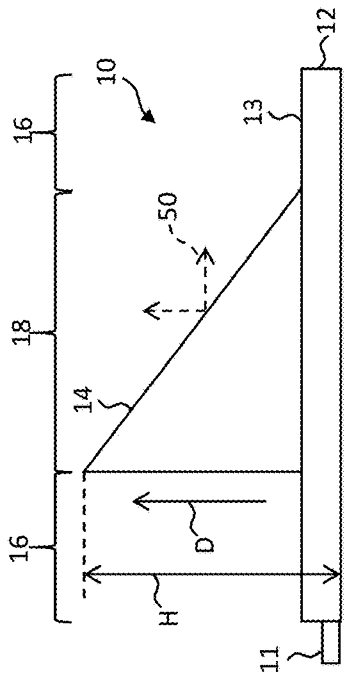
FIG. 1C is a cross section of a micro-optical component according to illustrative embodiments of the present disclosure.
Figure 2:
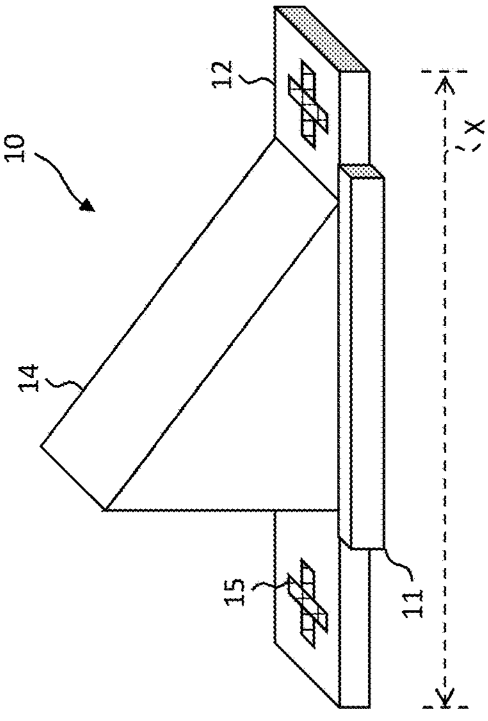
FIG. 2 is a perspective of a micro-optical component according to illustrative embodiments of the present disclosure.
Figure 3:
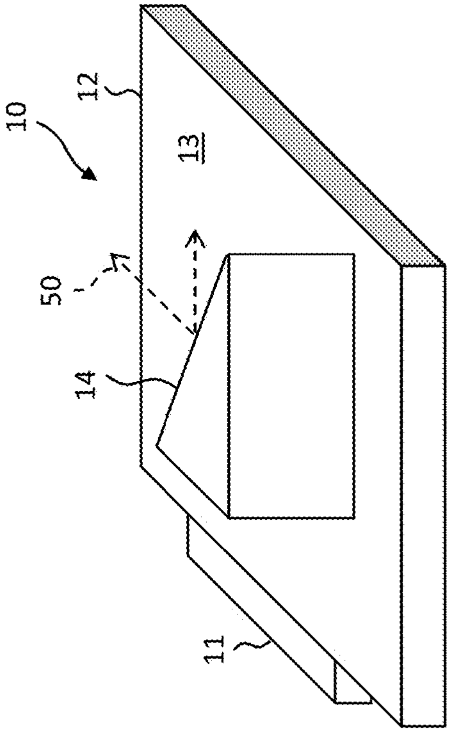
FIG. 3 is a perspective of a reflective or refractive micro-optical component according to illustrative embodiments of the present disclosure.

FIGS. 1A-2 illustrate micro-optical elements 14 that can redirect light 50 propagating parallel to micro-substrate surface 13 to a direction perpendicular to micro-substrate surface 13, or vice versa. FIG. 3 illustrates micro-optical elements 14 that can redirect light 50 propagating parallel to micro-substrate surface 13 to a different direction that is also parallel to micro-substrate surface 13. In some such embodiments, light 50 modified by micro-optical element 14 propagates parallel to micro-substrate 12 and micro-substrate 12 is substantially opaque to or absorbs such light 50, or ambient or stray light 50. For example, micro-substrate 12 can absorb no less than 50%, 75%, 80%, 85%, 90% or 95% of light 50 incident on micro-substrate 12.

Figure 4:
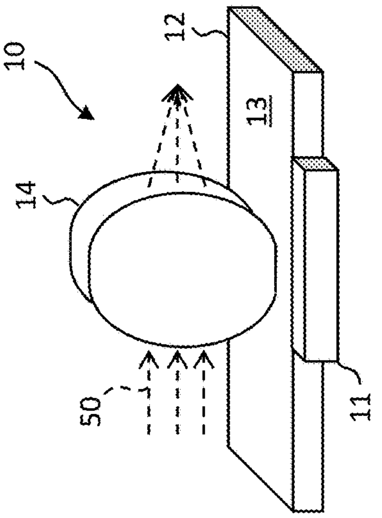
FIGS. 4 and 5 are perspectives of refractive micro-optical components according to illustrative embodiments of the present disclosure.
Figure 5:
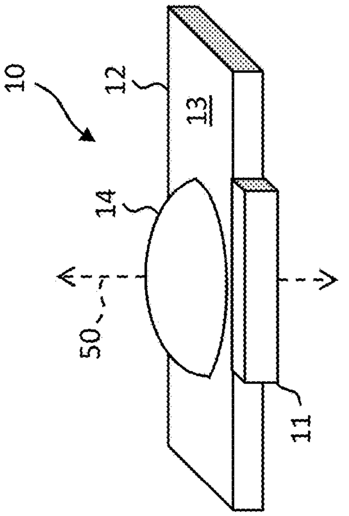

FIGS. 1A-3 illustrate a micro-optical element 14 with planar surfaces suitable for modifying light 50 by reflection or refraction. FIGS. 4 and 5 illustrate micro-optical elements 14 with curved surfaces suitable for a lens, e.g., a biconvex lens, biconcave lens, convex lens, or concave lens. Such curves can be spherical, aspherical, or have an arbitrary surface shape. Thus, micro-optical elements 14 can be a lens, e.g., a spherical lens, an aspherical lens, or a lens with an arbitrary surface shape. As shown in FIG. 4, a biconcave lens is arranged to modify (e.g., refractively focus) light 50 propagating parallel to micro-substrate surface 13. As shown in FIG. 5, a convex lens is arranged to modify (e.g., focus) light 50 propagating perpendicular to micro-substrate surface 13. Micro-optical elements 14 of the present disclosure can focus, defocus, or randomly redistribute (e.g., diffuse) incident light 50. Micro-substrate 12 can be a diffuser.

Figure 6:
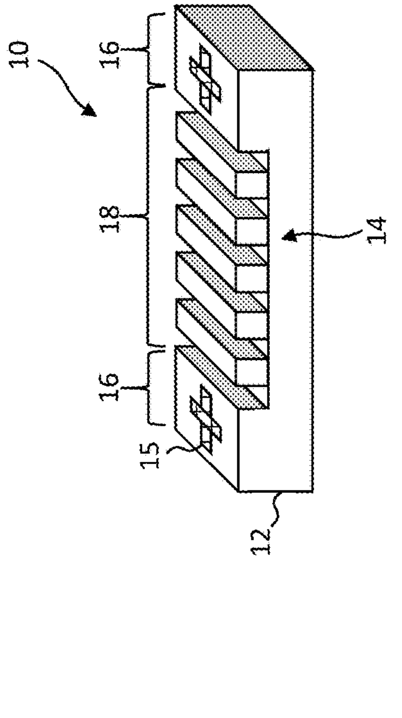
FIG. 6 is a perspective of a diffractive micro-optical component according to illustrative embodiments of the present disclosure.

In some embodiments and as illustrated in FIGS. 1A-5, micro-optical element 14 extends away from (e.g., above or below) micro-substrate 12 in a direction orthogonal to micro-substrate surface 13. In some embodiments and as shown in FIG. 6, micro-optical element 14 does not extend away from micro-substrate 12 but is instead integrated into micro-substrate surface 13 for example to form a diffraction grating disposed on or in micro-substrate surface 13 of micro-substrate 12. In some embodiments, micro-optical element 14 is a Fresnel lens.

Figure 7A:
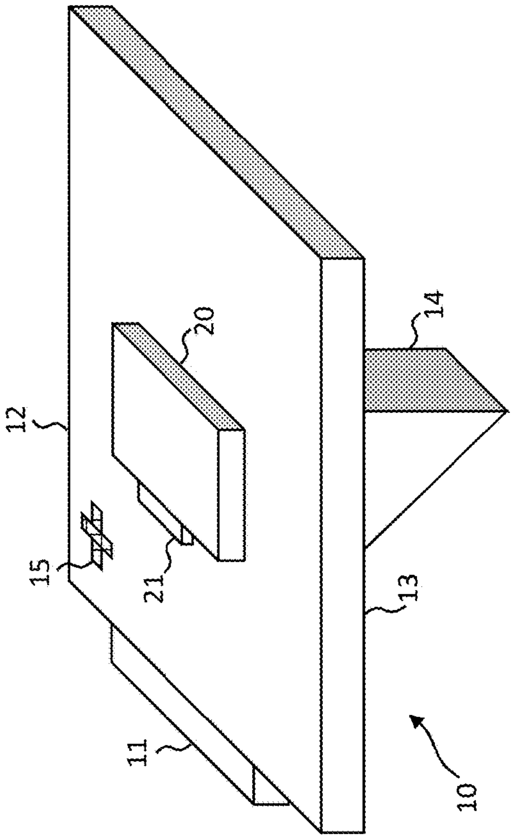
FIG. 7A is a perspective and FIG. 7B is a cross section of a micro-optical component comprising a light-active element according to illustrative embodiments of the present disclosure.
Figure 7B:
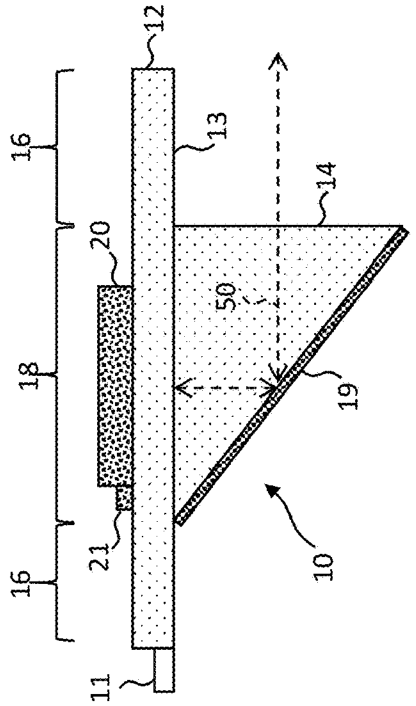

FIGS. 7A and 7B illustrate micro-optical components 10 of the present disclosure comprising a light-active element 20, for example a light-generating element (such as a laser for example a vertical-cavity surface-emission laser or light-emitting diode), a light-responsive element (a light sensor such as a photodiode or phototransistor), or a light-modulating element (such as an optical amplifier or modulator) disposed on micro-substrate 12 on a side of micro-substrate 12 opposite micro-optical element 14, e.g., on a side of micro-substrate 12 opposite micro-substrate surface 13. Such light-active elements 20 can emit light 50 into micro-optical element 14, sense light 50 propagating out of micro-optical element 14 or modify light 50 transmitted through micro-optical element 14. Light-active elements 20 can be disposed on a side of micro-substrate 12 opposite micro-optical element 14 and after micro-substrate 12 and micro-optical element 14 are formed as described below, for example by micro-transfer printing from a light-active element source wafer onto micro-substrate 12 either before or after micro-optical component 10 is micro-transfer printed from micro-optical component source wafer 30 to system substrate 40. Thus, light-active elements 20 can comprise or be attached to a broken (e.g., fractured) or separated light-active element tether 21 (shown in FIGS. 7A and 7B). FIG. 7B illustrates a reflective coating 19 applied to a surface of micro-optical element 14 to redirect light 50 received from or sent to light-active element 20. Micro-substrate 12 can have substantially parallel and smooth opposing sides, e.g., forming a substrate as is found in display substrates and semiconductor wafers. (In FIGS. 7A and 7B, for clarity micro-optical element 14 is shown inverted with respect to FIGS. 1A-5.)

In some embodiments of the present disclosure, micro-substrate 12 and micro-optical element 14 are unitary and integral, for example comprise a single structure having different portions, can comprise a same material, can be a same material, or can be made in a common process, for example in a common manufacturing step or steps with common materials. Micro-optical component 10 can be monolithic. For example, in some embodiments, micro-optical component 10 comprises a curable polymer, such as a photoresist, epoxy, or resin. In some embodiments, micro-substrate 12 comprises a different material from micro-optical element 14 and can be made using different steps at different times or can comprise different structures made at different times in different places of different materials adhered together, for example micro-optical element 14 can be adhered to micro-substrate surface 13 of micro-substrate 12 with an optically clear adhesive. In some embodiments, the adhesive can be a metal, e.g., a reflective metal or a solder. Micro-substrate 12 can have substantially parallel opposing sides (as shown in the Figures) or can have opposing sides that are not parallel. For example, in some embodiments, micro-substrate 12 comprises a substantially transparent oxide such as silicon dioxide and micro-optical element 14 comprises a curable polymer. In some embodiments, micro-substrate 12 is not substantially transparent to light 50 and can comprise, for example, a ceramic or light-absorbing resin. Either or both of micro-substrate 12 and micro-optical element 14 of micro-optical component 10 can be made by injection molding, stamping, etching, two-photon polymerization, micro- or nano-imprinting, imprint lithography (e.g., nanoimprint lithography) or any of various photolithographic processing steps separately or at the same time, including but not limited to any one or combination of spray coating, spin coating, blade coating, hopper coating, curtain coating, evaporative coating, sputtering, ablation, masking, etching, and curing.

Figure 8A:
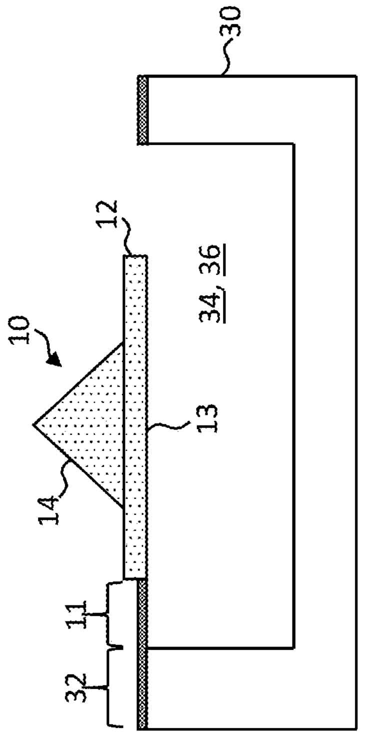
FIGS. 8A-8D are cross sections of micro-optical component source wafers with different released micro-optical components suspended over an etched sacrificial layer defining a gap according to illustrative embodiments of the present disclosure.
Figure 8B:
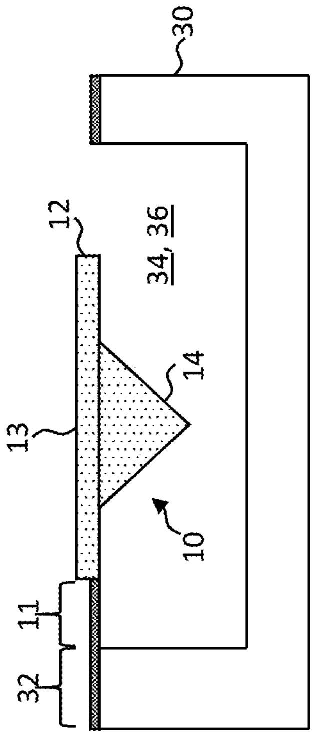
Figure 8C:
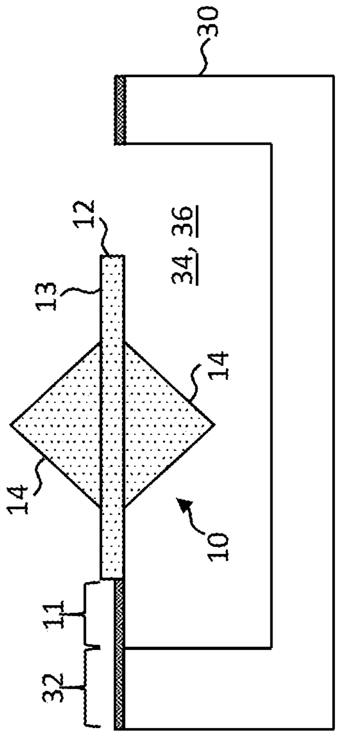
Figure 8D:
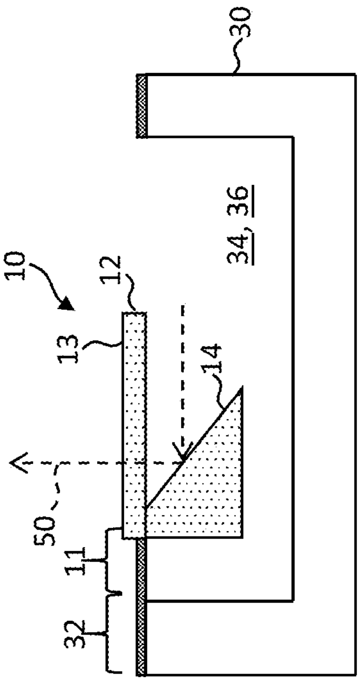

FIGS. 8A-8D illustrate a micro-optical component source wafer 30 for micro-optical components 10. As shown in FIGS. 8A-8D, micro-optical components 10 can be constructed by providing a component source wafer 30 or substrate having sacrificial portions 34 or gaps 36 separated by anchors 32 (e.g., anchor portions 32 of micro-optical component source wafer 30). If sacrificial portion 34 is etched to form gap 36, micro-optical component 10 can be suspended over gap 36 by component tethers 11 connected to anchors 32. Micro-optical element 14 can extend in a direction away from sacrificial portion 34 or gap 36 (as shown in FIG. 8A), can extend into sacrificial portion 34 or gap 36 (as shown in FIGS. 8B and 8D), or both (as shown in FIG. 8C). In some embodiments, micro-optical component 10 can manipulate or otherwise process multiple beams of light 50 using multiple micro-optical elements 14 disposed on a common micro-substrate 12 (e.g., as shown in FIG. 8C). In some embodiments, micro-optical component 10 can manipulate or otherwise process multiple beams of light 50 using a single, common micro-optical element 14 disposed on a micro-substrate 12. FIG. 8D illustrates micro-optical component 10 structure with a prism having a light-reflective surface for reflecting light 50 external to the prism through micro-substrate 12.

In some embodiments, micro-optical component 10 is coated with a material, such as a polymer or inorganic oxide or nitride, such as silicon dioxide or silicon nitride that is differentially etchable from a material of sacrificial portions 34 or micro-optical component source wafer 30. The material is processed, for example using photolithographic methods and materials including masking and etching or, in some embodiments, by rinsing. Such a method is particularly useful for inorganic materials but can also be used by organic materials. In some embodiments, the material is coated in a liquid state, photolithographically processed, and then cured. (The liquid material can be soft-cured before photolithographic processing.) In some embodiments, the material is coated in a liquid state, shaped, and then cured. The material can be, but is not necessarily, soft-cured before shaping. Organic materials, for example polymers, can be shaped by micro-imprinting (micro-molding), for example with a master mold such as a photolithographically constructed silicon master mold, and then cured (either with the mold in place or after the mold is removed), or shaped by two-photon polymerization, to form micro-optical component 10. Micro-optical components 10 can be photolithographically processed after micro-molding, for example to segment multiple micro-optical components 10 from each other over the surface of component source wafer 30 or to provide additional optical or protective encapsulating layers. The additional layers can be patterned.

Once micro-optical components 10 are constructed, they can be under-etched by etching sacrificial portions 34 to form a gap 36 and suspend micro-optical components 10 over gap 36 and component source wafer 30 by a component tether 11. In some embodiments, micro-substrate 12 or micro-optical element 14 is differentially etchable from a material comprising sacrificial portion 34. For example, micro-substrate 12 or micro-optical element 14 can comprise a layer of silicon dioxide or silicon nitride disposed and patterned over sacrificial portion 34 and component source wafer 30 and sacrificial portion 34 can comprise a semiconductor such as silicon. Micro-optical element 14 is then formed, for example by micro-imprinting and curing a polymer layer or using two-photon polymerization to cure a polymer layer, and then encapsulated to protect the cured polymer material from the sacrificial portion 34 etching process.

In some embodiments, sacrificial portion 34 of component source wafer 30 is photolithographically processed to form physical structures such as indentations or pits, for example inverted pyramids, as a mold in a material of sacrificial portion 34, for example a material such as crystalline silicon. The structured surface of sacrificial portion 34 is coated, e.g., by sputtering, evaporation, spin coating, spray coating, or slot coating with a material of micro-optical component 10, and then shaped, for example by photolithographic processing or by micro-imprinting and curing, to construct micro-optical component 10 on sacrificial portion 34. Sacrificial portion 34 is then etched to suspend micro-optical component 10 over sacrificial portion 34 and component source wafer 30. Thus, micro-optical element 14 can extend from micro-substrate 12 towards micro-optical component source wafer 30 or away from micro-optical component source wafer 30, depending on the method of construction used. The specific angle of the mold and, hence, micro-optical element 14 with respect to micro-substrate 12 can be defined by the crystalline nature of sacrificial portion 34, for example due to crystallographic orientation of (e.g., fast) etch planes relative to a crystallographic orientation of micro-optical component source wafer 30.

Figure 9A:
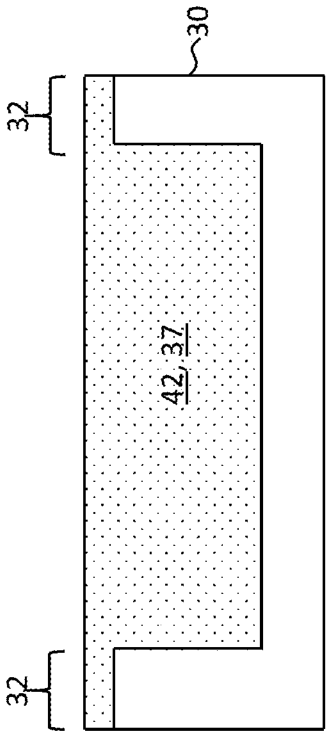
FIGS. 9A-9D are successive cross sections of structures illustrating steps for constructing a micro-optical component source wafer with a released micro-optical component suspended over a gap using two-photon polymerization according to illustrative embodiments of the present disclosure.
Figure 9B:
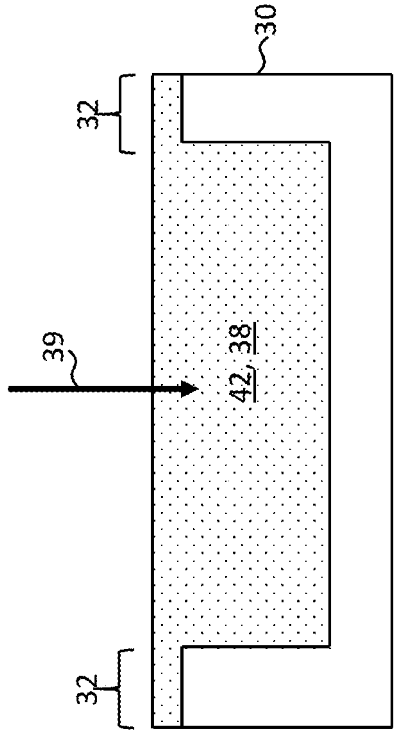
Figure 9C:
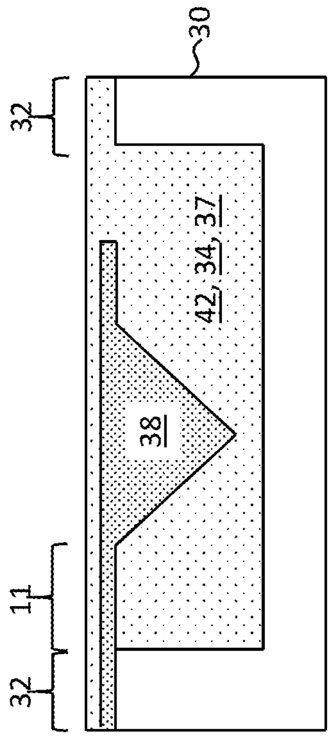
Figure 9D:
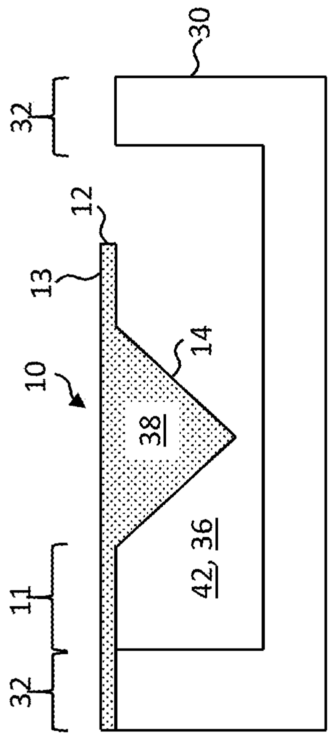

Micro-optical components 10 can be constructed in a variety of ways. In some embodiments of the present disclosure and as shown in FIGS. 9A-9D, a cavity 42 separated by anchors 32 is formed in component source wafer 30, for example using photolithographic methods and materials, and coated with a liquid, uncured polymer 37 (e.g., by spin, spray, hopper, or curtain coating or using an inkjet deposition device) to planarize a surface of component source wafer 30 or at least coat or partially fill cavity 42, as shown in FIG. 9A. Uncured polymer 37 is then exposed to radiation 39 and cured, for example using two-photon polymerization (e.g., direct-laser writing), as shown in FIG. 9B, to cure a three-dimensional structure (e.g., cured polymer 38) forming micro-optical component 10 with micro-substrate 12, micro-optical element 14, and component tether 11, as shown in FIG. 9C. Uncured polymer 37 is then washed (rinsed) away, as shown in FIG. 9D to form micro-optical component 10 attached to anchor 32 with component tether 11 and suspended over gap 36 in cavity 42, ready for micro-transfer printing. In some such embodiments, micro-optical component 10 is unitary (e.g., monolithic) and comprises a single material and structure. Such a two-photon polymerization method can be used to construct any of the micro-optical component 10 structures illustrated in FIGS. 8A-8D.

Figure 10A:
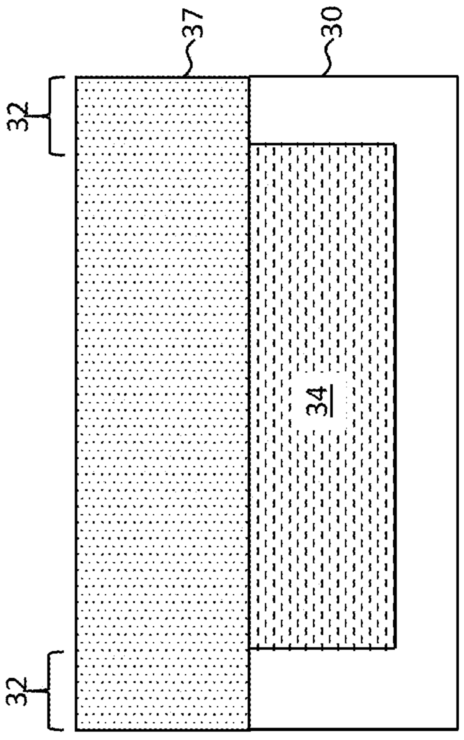
FIGS. 10A-10D are successive cross sections of structures illustrating steps for constructing a released micro-optical component suspended over an etched sacrificial layer defining a gap on a component source wafer using nanoimprint lithography according to illustrative embodiments of the present disclosure.
Figure 10B:
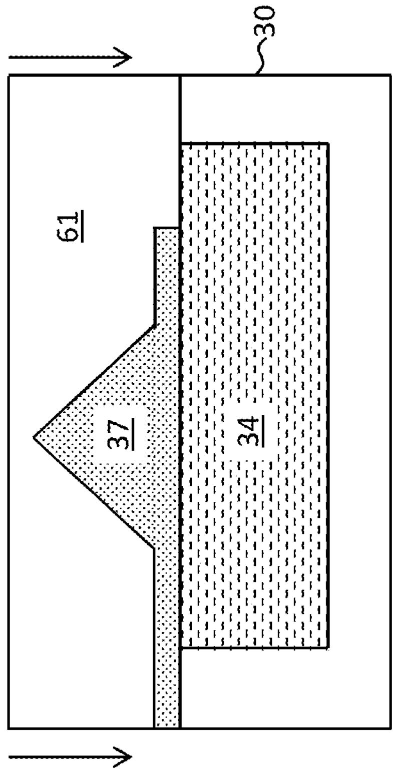
Figure 10C:
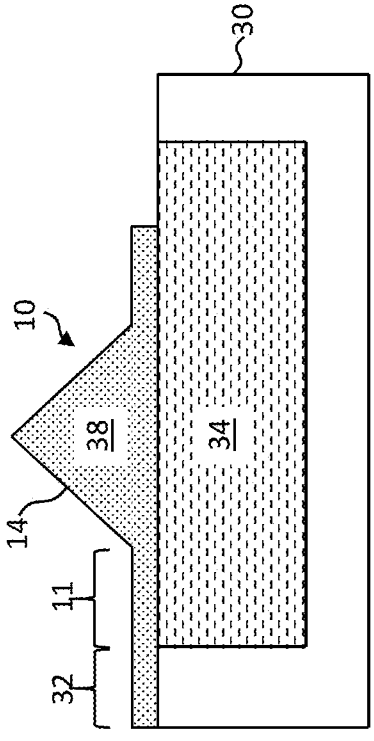
Figure 10D:
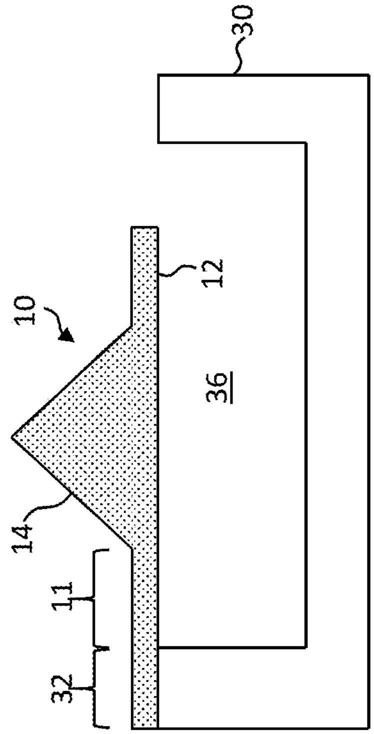

In some embodiments of the present disclosure and as shown in FIGS. 10A-10C, sacrificial portions 34 separated by anchors 32 are formed in component source wafer 30, for example using photolithographic methods and materials, and coated with a liquid, uncured polymer 37 (e.g., by spin, spray, hopper, or curtain coating or using an inkjet deposition device) to planarize a surface of component source wafer 30 or at least coat or partially cover sacrificial portion 34, as shown in FIG. 10A. Uncured polymer 37 is then micro-imprinted (e.g., with an imprint stamp 61 using imprint lithography) and cured, for example using heat or radiation 39, as shown in FIG. 9B, to cure a three-dimensional structure (e.g., cured polymer 38) forming micro-optical component 10 and component tether 11, as shown in FIG. 10C, before or after imprint stamp 61 is removed. In some embodiments, uncured polymer 37 is soft-cured first before or during imprinting and before final hard curing. Sacrificial portion 34 is then etched with an etchant, as shown in FIG. 10D to form micro-optical component 10 attached to anchor 32 by component tether 11 and suspended over gap 36, ready for micro-transfer printing. In some such embodiments, micro-optical component 10 is unitary (e.g., monolithic) and comprises a single material and structure. Materials of sacrificial portion 34 can be differentially etchable from cured polymer 38. In some embodiments a protective or encapsulating coating can be disposed on sacrificial portion 34 (and optionally anchor 32) or over cured polymer 38 to protect micro-optical component 10 from the etchant.

Figure 11A:
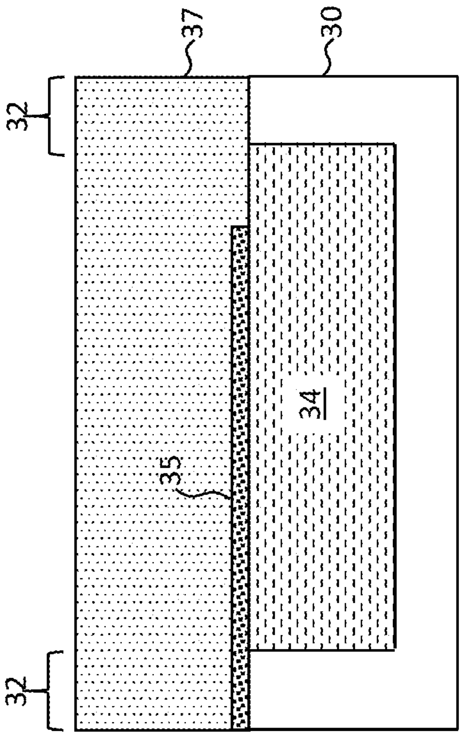
FIGS. 11A-11D are successive cross sections illustrating steps for constructing a released micro-optical component having a protective layer on a component source wafer according to illustrative embodiments of the present disclosure.
Figure 11B:
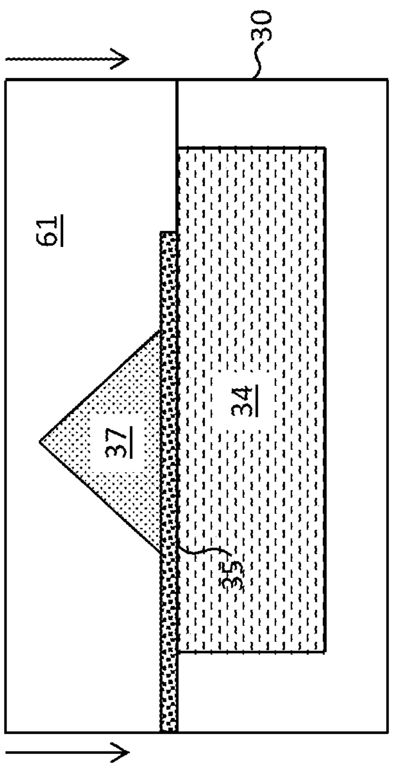
Figure 11C:
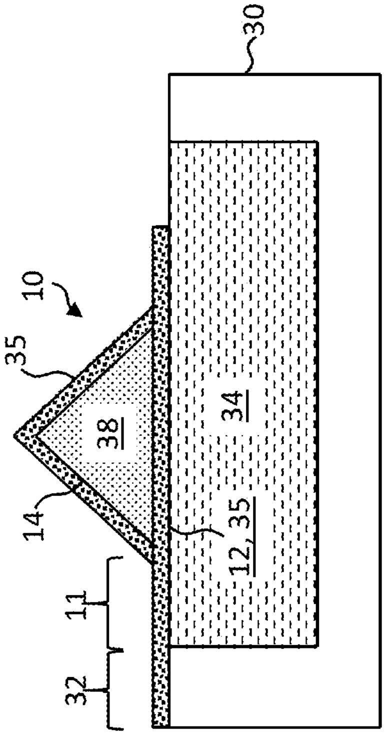
Figure 11D:
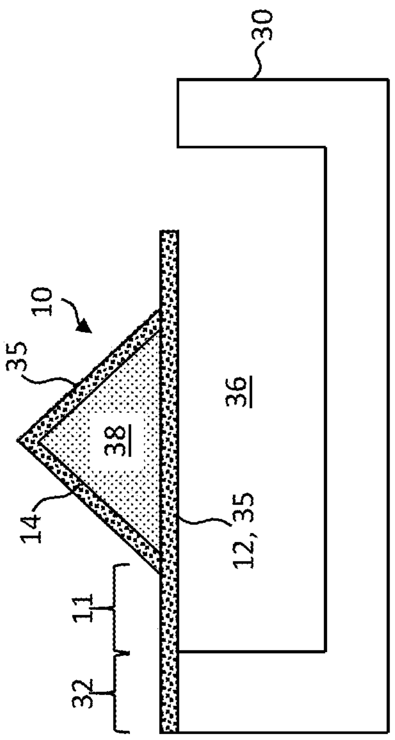

FIGS. 11A-11D illustrates structures and methods similar to FIGS. 10-10D that have a protective layer 35 (e.g., an encapsulating layer) that can protect micro-substrate 12 and micro-optical element 14 from an etchant used to etch sacrificial layer 34. For example, protective layer 35 can be an inorganic material such as silicon dioxide or silicon nitride. A patterned layer of such material can be patterned over sacrificial portion 34 and, optionally anchors 32 (as shown in FIG. 11A). Micro-substrate 12 and micro-element 14 can be formed over protective layer 35 (as shown in FIG. 11B) and an additional patterned coating of protective layer 35 disposed over and protecting micro-substrate 12 and micro-optical element 14 (as shown in FIG. 11C), before etching sacrificial portion 34 to form gap 36, as shown in FIG. 11D. Although not shown in FIGS. 9A-9C, protective layer 35 can also be provided to protect micro-substrate 12 and micro-optical element 14 in such embodiments. Protective layer 35 can also provide structural integrity, e.g., make micro-substrate 12 and micro-optical element 14 stronger, and provide desirable optical effects. In some such embodiments, micro-optical component 10 is not necessarily unitary and can, for example, comprise different materials (e.g., an inorganic protective layer 35 material and an organic or polymer material).

Figure 12A:
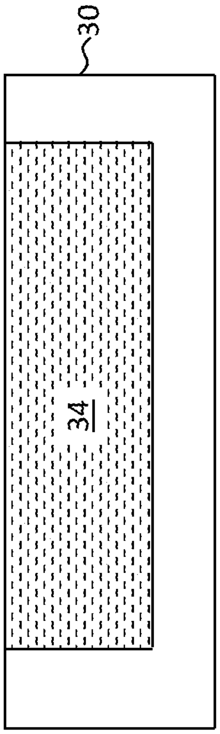
FIGS. 12A-12D are successive cross sections of structures illustrating steps for constructing a released micro-optical component on a component source wafer with a mold according to illustrative embodiments of the present disclosure.
Figure 12B:
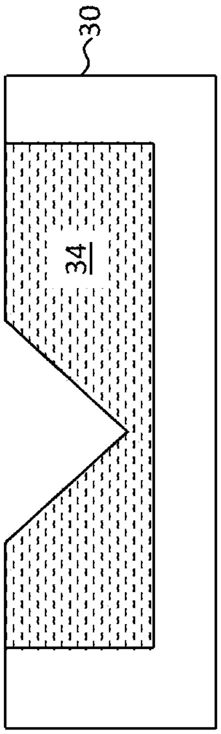
Figure 12C:
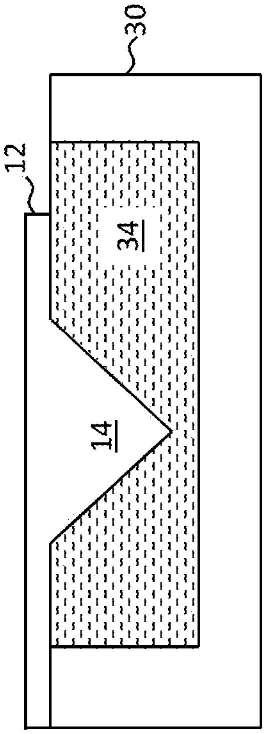
Figure 12D:
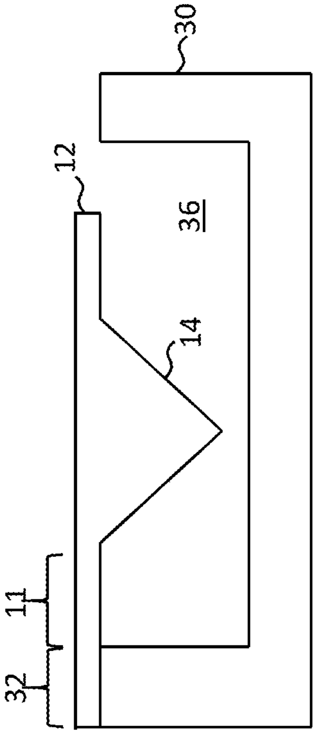
Figure 12F:
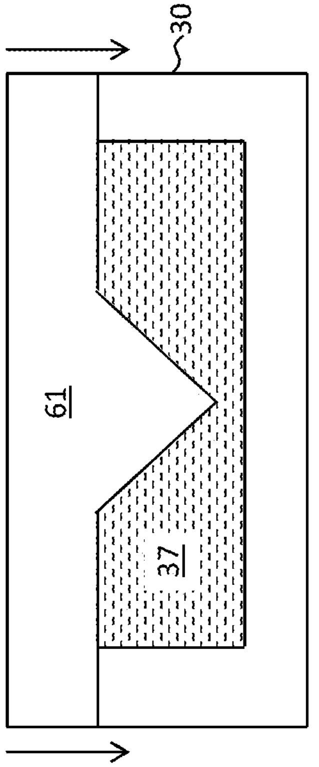
FIG. 12F is a cross section illustrating making a mold in a sacrificial layer of a component source wafer using imprint (e.g., nanoimprint) lithography according to illustrative embodiments of the present disclosure.
Figure 12E:
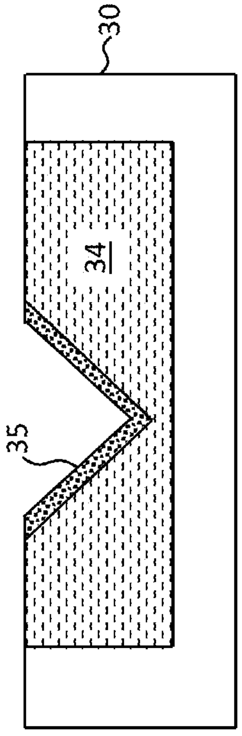
FIG. 12E is a cross section illustrating of a mold coated with a protective layer in a sacrificial layer of a component source wafer according to illustrative embodiments of the present disclosure.

FIGS. 12A-12E illustrate embodiments of the present disclosure that use photolithographic processes to form a mold in component source wafer 30 and on which micro-optical component 10 can be formed. As with embodiments in accordance with FIGS. 10A-11D, sacrificial portions 34 separated by anchors 32 are formed in component source wafer 30, for example using photolithographic methods and materials, as shown in FIG. 12A. Sacrificial portion 34 is then pattern-wise etched (for example using patterned photoresist disposed on sacrificial portion 34) to form a mold that is an inverse of micro-optical element 14, as shown in FIG. 12B. An optional protective layer 35 can be disposed and patterned on the mold, as shown in FIG. 12E. A material, for example an inorganic material such as silicon dioxide or silicon nitride or an organic material such as a polymer (with or without protective layer 35) is disposed on patterned sacrificial portion 34 and patterned to form at least a portion of micro-optical component 10, as shown in FIG. 12C. Sacrificial portion 34 can then be etched to suspend micro-optical component 10 over gap 36 with component tether 11 attached to anchor 32. In some such embodiments, micro-optical component 10 can be unitary (e.g., monolithic) and comprise a single material and structure or, as indicated with FIG. 12E, can comprise additional, different materials, such as protective layer 35. Materials of sacrificial portion 34 can be differentially etchable from a material of micro-optical component 10. In some embodiments, sacrificial portion 34 is a portion of component source wafer 30 and can comprise a semiconductor material, such as silicon that can be etched with respect to component source wafer 30 crystal planes to form the mold.

In some embodiments and as illustrated in FIG. 12F, a mold can be constructed by coating a cavity 42 formed in micro-optical component source wafer 30, for example as shown in FIG. 9A. Liquid uncured polymer 37 in cavity 42 is then imprinted with an imprint stamp 61, cured, and imprint stamp 61 removed, to form the mold and sacrificial portion 34 as shown in FIG. 12B. The remainder of the steps shown in FIGS. 12C and 12D can proceed as shown except that the etching step (e.g., removal of cured polymer 38) can use a different etchant. If micro-optical component 10 comprises cured polymer 38, protective layer 35 can enable differential etching of sacrificial portion 34 (cured polymer 38).

According to embodiments of the present disclosure, different two-photon polymerization, micro-imprint, and/or photolithographic methods can be combined to make different micro-optical elements 14 in a micro-optical component 10 or different portions of micro-optical component 10, for example to make the different micro-optical elements 14 in micro-optical component 10 of FIG. 8C, for example first making the structures found in FIGS. 12A-12C followed by the steps illustrated in FIGS. 10A-10C (or FIGS. 11A-11C), followed by the etching step of FIGS. 9D, 10D, 11D, and 12D.

Figure 13:
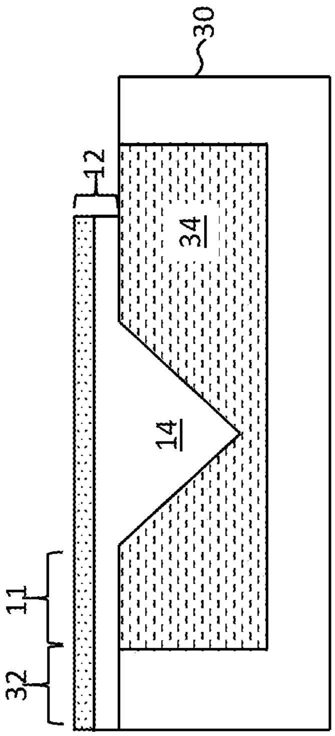
FIG. 13 is a cross section of a micro-optic component and hybrid tether on a sacrificial portion of a component source wafer according to illustrative embodiments of the present disclosure.

In some embodiments, component tethers 11 can comprise only organic materials, e.g., as shown in FIG. 10C, or only inorganic materials, e.g., as shown in FIG. 11C. In some embodiments, component tethers 11 are a hybrid tether comprising both organic and inorganic materials, as shown in FIG. 13. FIG. 13 illustrates a micro-substrate 12 and component tether 11 comprising a top inorganic layer coated on a bottom organic layer (or vice versa). Hybrid component tethers 11 can have improved fracture characteristics with fewer contaminating particles.

Those knowledgeable in two-photon polymerization, micro-imprinting, and photolithography will appreciate that the methods described herein for making micro-optical components 10 are not limited in the different micro-optical structures that can be formed. In particular, a great variety of micro-optical elements 14 can be constructed using these techniques. Furthermore, a variety of materials can used in, and coatings applied to, micro-optical elements 14 of the present disclosure. Non-optical micro-transfer-printable components, devices, and structures can also be constructed using these techniques.

Figure 14A:
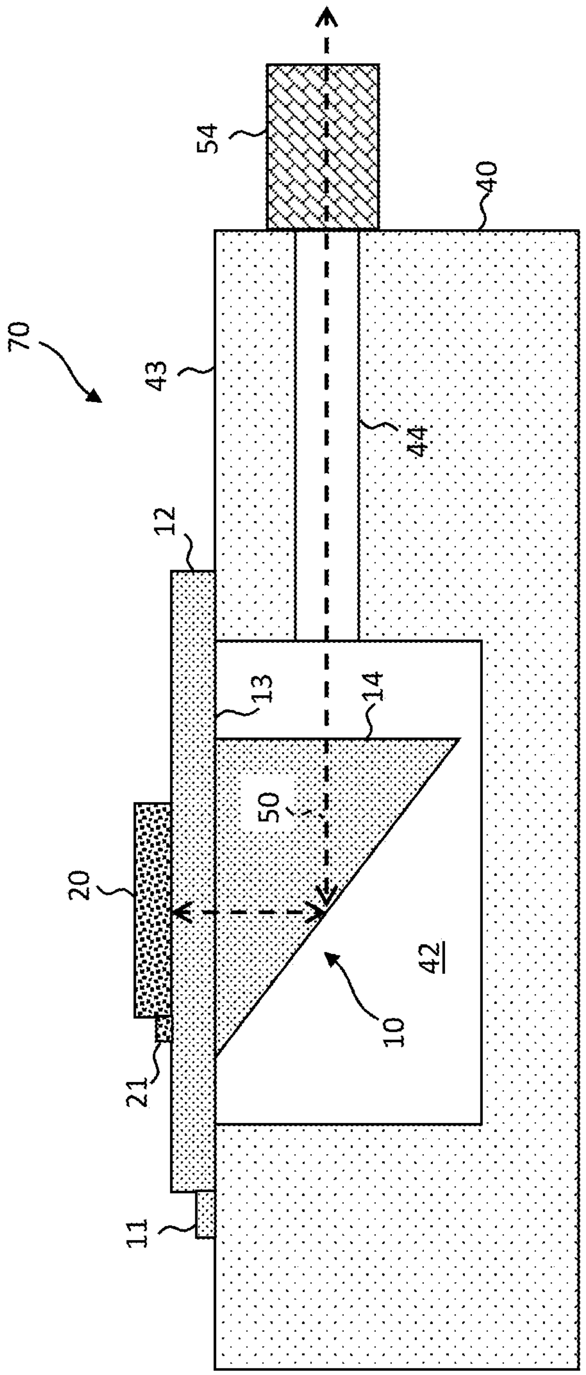
FIG. 14A is a cross section of a micro-optical system comprising a micro-optical component with a micro-optical element at least partially in a cavity in a system substrate according to illustrative embodiments of the present disclosure.
Figure 14B:
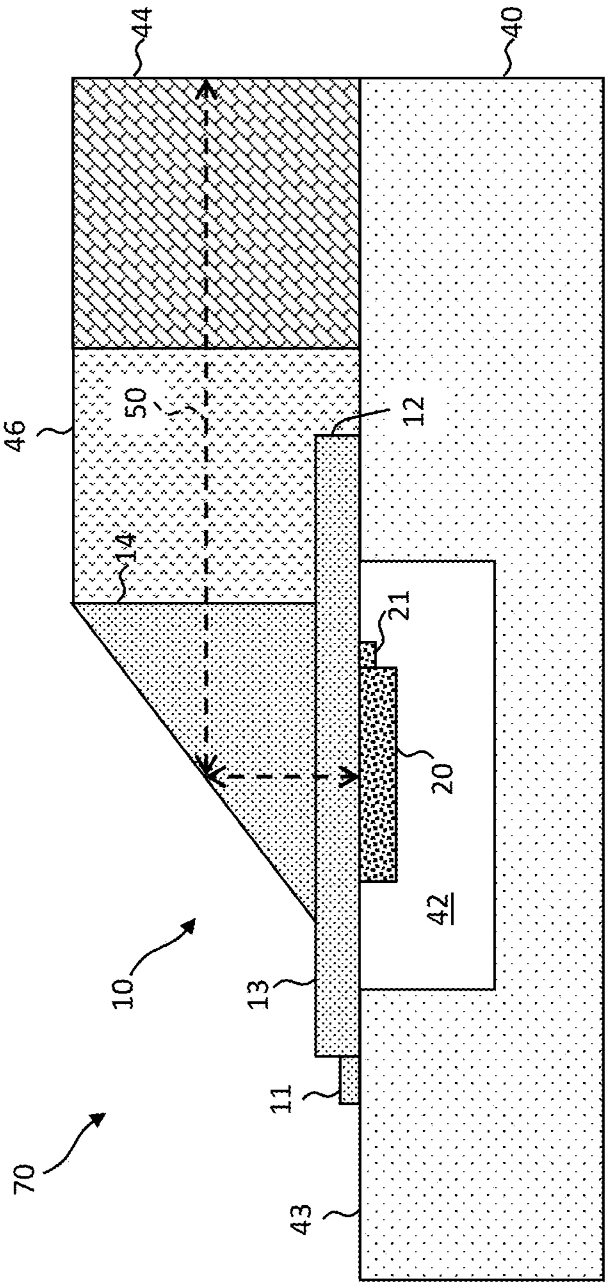
FIG. 14B is a cross section of a micro-optical system comprising a micro-optical component with a light-active element at least partially in a cavity in a system substrate and a micro-optical element over the cavity according to illustrative embodiments of the present disclosure.

The location of a light beam 50 that reflects or refracts from a surface of micro-optical element 14 can be accommodated by a correspondingly located light-active element 20 or light-transmissive element such as a light pipe 44 (e.g., an optical wave guide) in a micro-optical system 70 comprising micro-optical component 10, as shown in FIG. 14A. FIG. 14A illustrates a micro-optical component 10 disposed on a system substrate 40, for example by micro-transfer printing. Micro-optical element 14 of micro-optical component 10 is disposed on system substrate 40 and aligned with, and at least partially within a cavity 42 formed in system substrate 40, for example by pattern-wise etching. Cavity 42 can have cavity walls and a cavity floor. Micro-substrate 12 is disposed on a system-substrate surface 43 of system substrate 40, for example at least some portion of micro-substrate area 16 of micro-substrate 12 exclusive of micro-optical element area 18 can adhere to system-substrate surface 43 of system substrate 40 with or without an adhesive. Micro-optical element 14 can be disposed in alignment with light-active element 20 and a light-transmissive structure such as light pipe 44 formed in system substrate 40 to direct light 50 to or from light-active element 20 optionally using micro-optic element 14. Light pipe 44 can direct light 50 into or out of micro-optical system 70 from a fiber-optic cable 54 disposed in alignment with light pipe 44 and system substrate 40. In some embodiments, fiber-optic cable 54 is disposed in alignment with light pipe 44 in system substrate 40 (e.g., as shown in FIG. 14A). In some embodiments, fiber-optic cable 54 is disposed in alignment with light pipe 44 on system substrate 40 (e.g., as shown in FIG. 14B). In some embodiments, fiber-optic cable 54 is disposed in alignment with light 50 propagating through free space above or over system substrate 40 (e.g., as shown in FIG. 15).

Figure 14C:
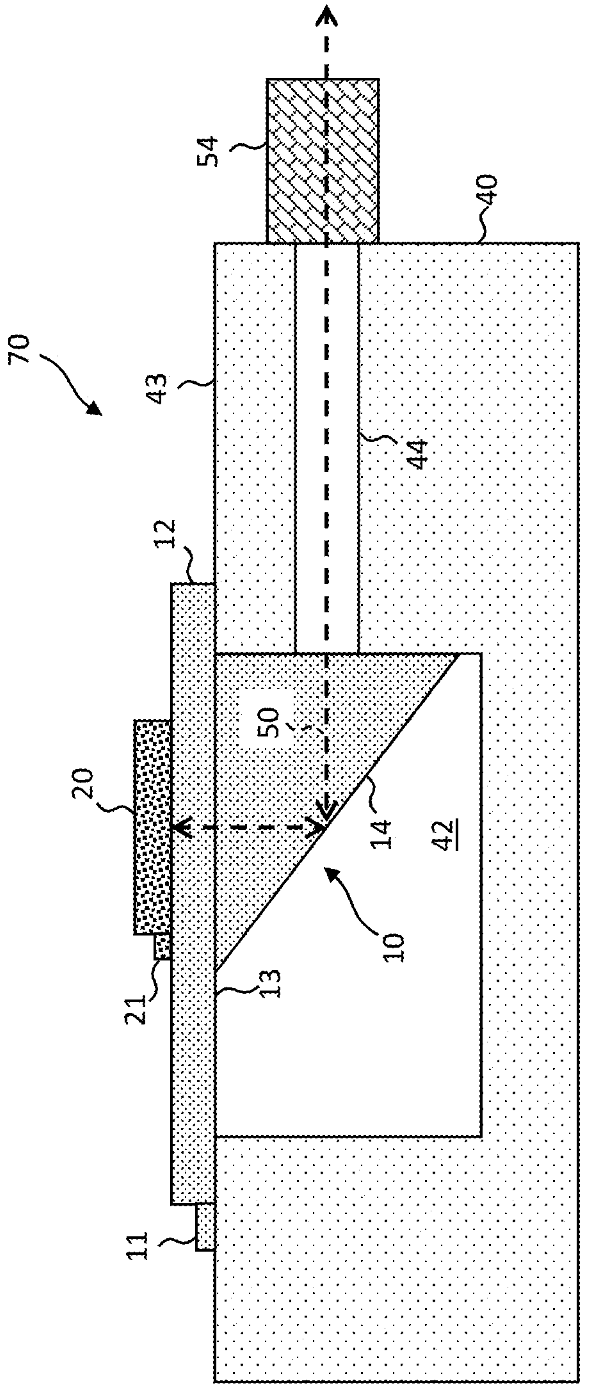
FIG. 14C is a cross section of a micro-optical system comprising a micro-optical component with a micro-optical element at least partially in a cavity in a system substrate and in contact with or adhered to a wall of the cavity according to illustrative embodiments of the present disclosure.
Figure 14D:
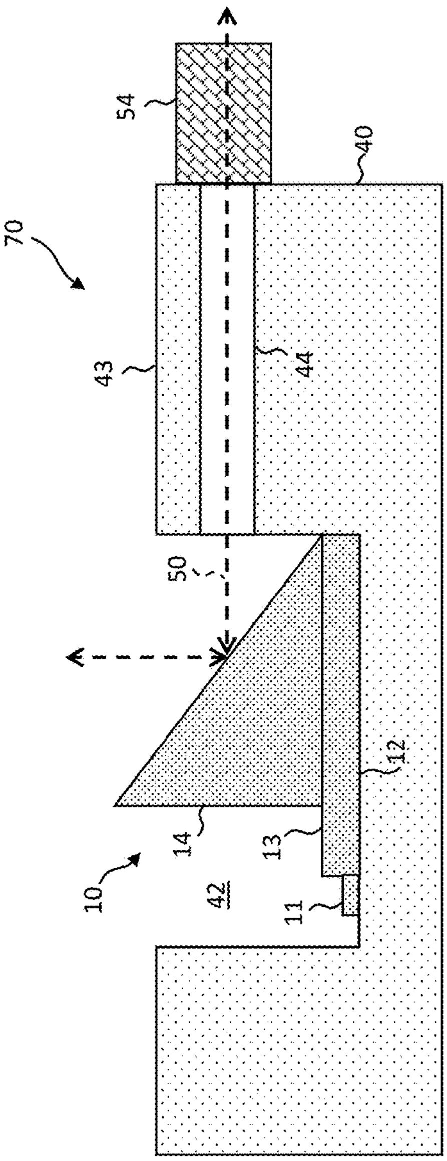
FIG. 14D is a cross section of a micro-optical system comprising a micro-optical component at least partially in a cavity in a system substrate and in contact with or adhered to a floor of the cavity according to illustrative embodiments of the present disclosure.
Figure 14E:
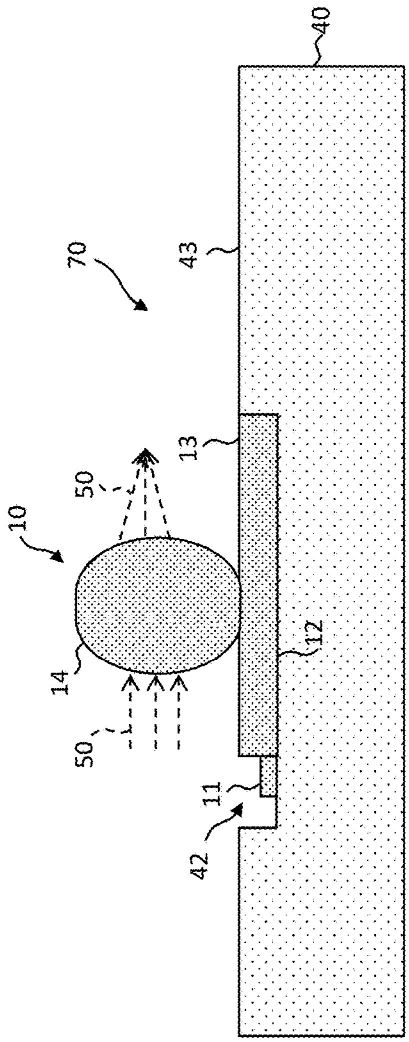
FIG. 14E is a cross section of a micro-optical system comprising a micro-optical component with a micro-substrate at least partially in a cavity in a system substrate and in contact with or adhered to a floor of the cavity according to illustrative embodiments of the present disclosure.

FIG. 14B illustrates embodiments in which light-active element 20 is disposed in cavity 42 of system substrate 40 and light 50 is emitted to or received from light pipe 44 on system-substrate surface 43 through micro-optical element 14 in a micro-optical system 70. In some embodiments and as shown in FIG. 14B, light 50 can be transmitted over system-substrate surface 43 through light pipes 44 (e.g., patterned silicon nitride waveguides) disposed on system-substrate surface 43. Light pipe 44 can be connected to micro-optical element 14 with an optically clear or index-matching adhesive 46. FIG. 14C illustrates embodiments in which micro-optical element 14 is in contact with, adhered directly to, or adhered with an adhesive to a side (e.g., wall) of a cavity 42. Such a placement of micro-optical element 14 with respect to system substrate 40 (or structures such as light pipes 44 in or on system substrate 40) can enhance the optical performance of a micro-optical system 70. FIG. 14D illustrates micro-optical component 10 in cavity 42 with micro-substrate 12 adhered to the floor of cavity 42 (e.g., with or without an adhesive) with micro-optical element 14 extending over system-substrate surface 43. FIG. 14E illustrates micro-optical component 10 in cavity 42 with micro-substrate 12 adhered to the floor of cavity 42 (e.g., with or without an adhesive) with micro-substrate surface 13 substantially parallel to and within a common plane with system-substrate surface 43, e.g., within manufacturing limitations and tolerances.

Figure 15:
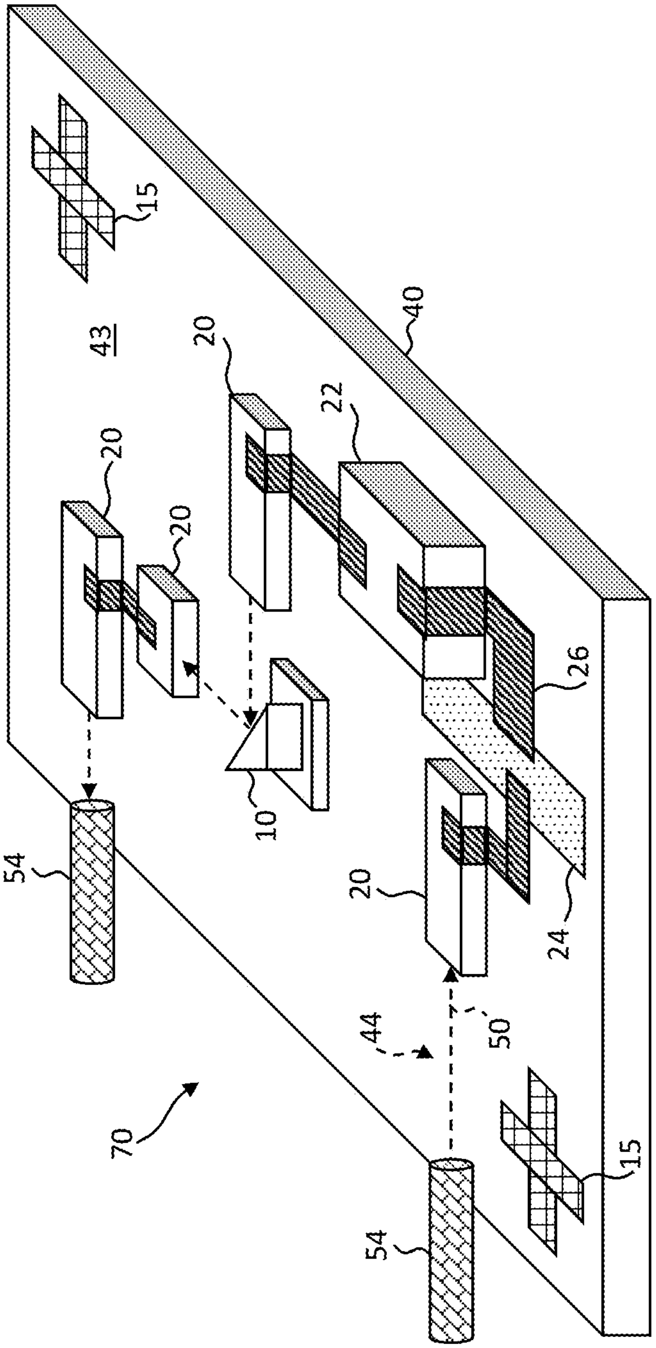
FIG. 15 is a perspective of a micro-optical system, for example a photonic integrated circuit, according to illustrative embodiments of the present disclosure.

In some embodiments and as shown in FIG. 15, light 50 can be transmitted over system-substrate surface 43 through free space (e.g., the local environment) and can be modified by one or more micro-optical elements 14 and emitted or received by light-active elements 20 in a micro-optical system 70. Light-active elements 20 can electrically interact with micro-electronic components 22 through electrodes 26 (e.g., photolithographically defined electrically conductive wires) to respond to electrical signals from light-active elements 20 or use electrical signals to control light-active elements 20. In some embodiments, and as shown in FIG. 14B, light 50 can propagate through light pipes 44 to and from micro-optical components 10 and light-active elements 20 disposed on system substrate 40 rather than through free space. System substrate 40 can comprise micro-alignment marks 15 (fiducial marks) disposed on or in system substrate 40 to assist in aligning micro-optical components 10 with system substrate 40 in a micro-optical system 70. (For clarity, micro-optical components 10 are not shown with micro-alignment marks 15 in all of the Figures.) Micro-alignment marks 15 can be made using photolithographic methods and materials, for example patterned and reflective or absorptive metal markings.

Figure 16A:
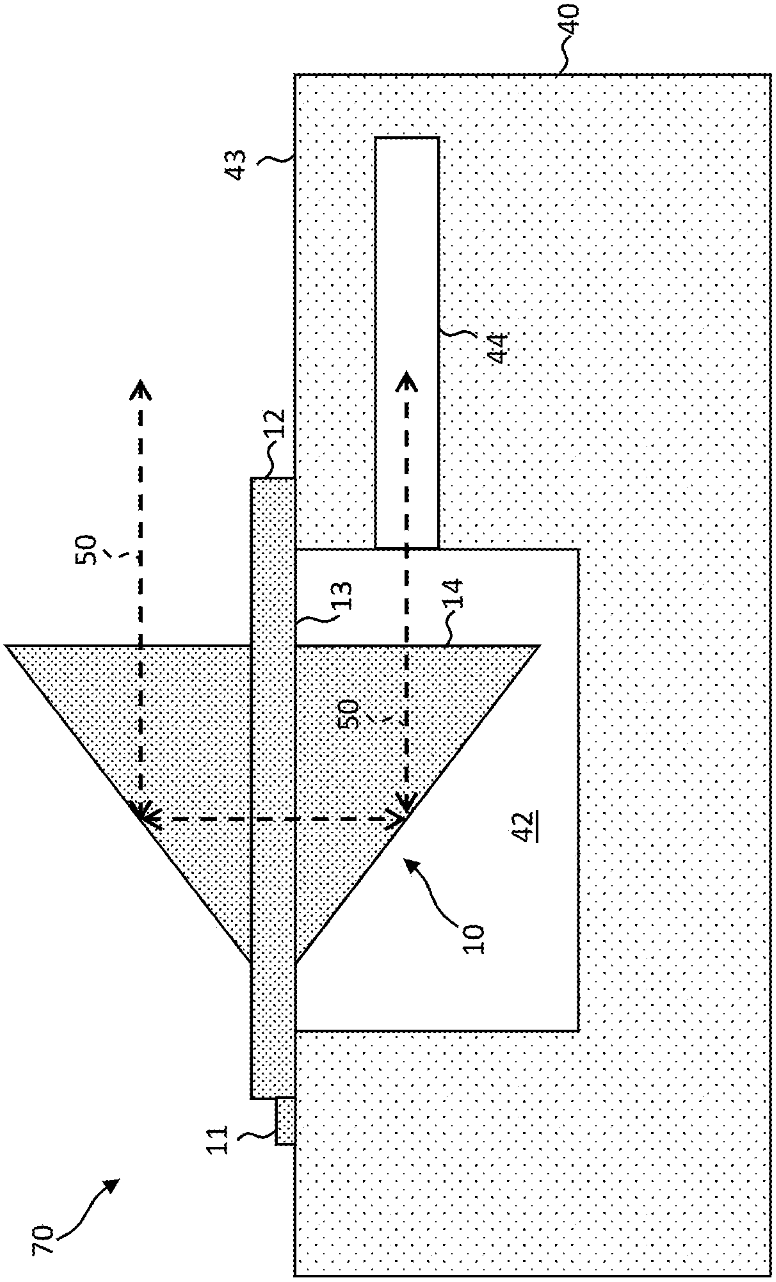
FIGS. 16A-16L are cross sections of micro-optical systems according to illustrative embodiments of the present disclosure.
Figure 16B:
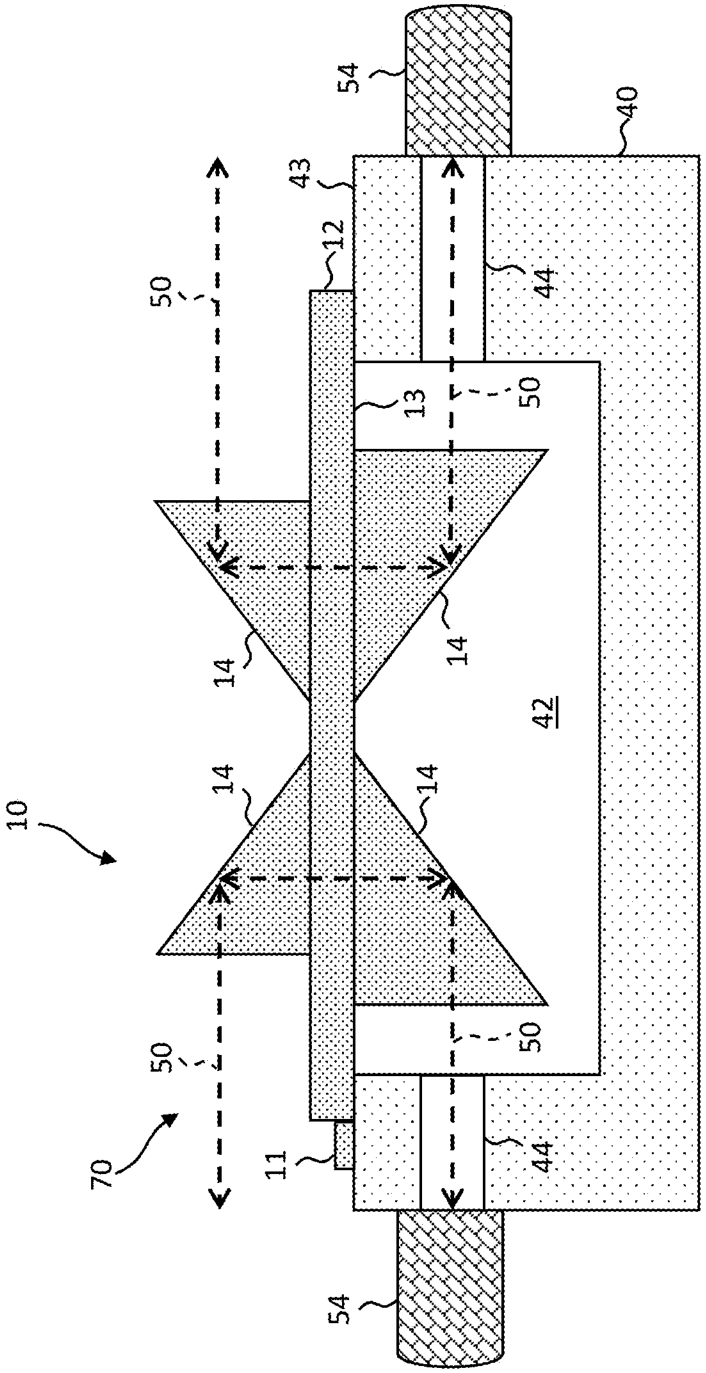
Figure 16C:
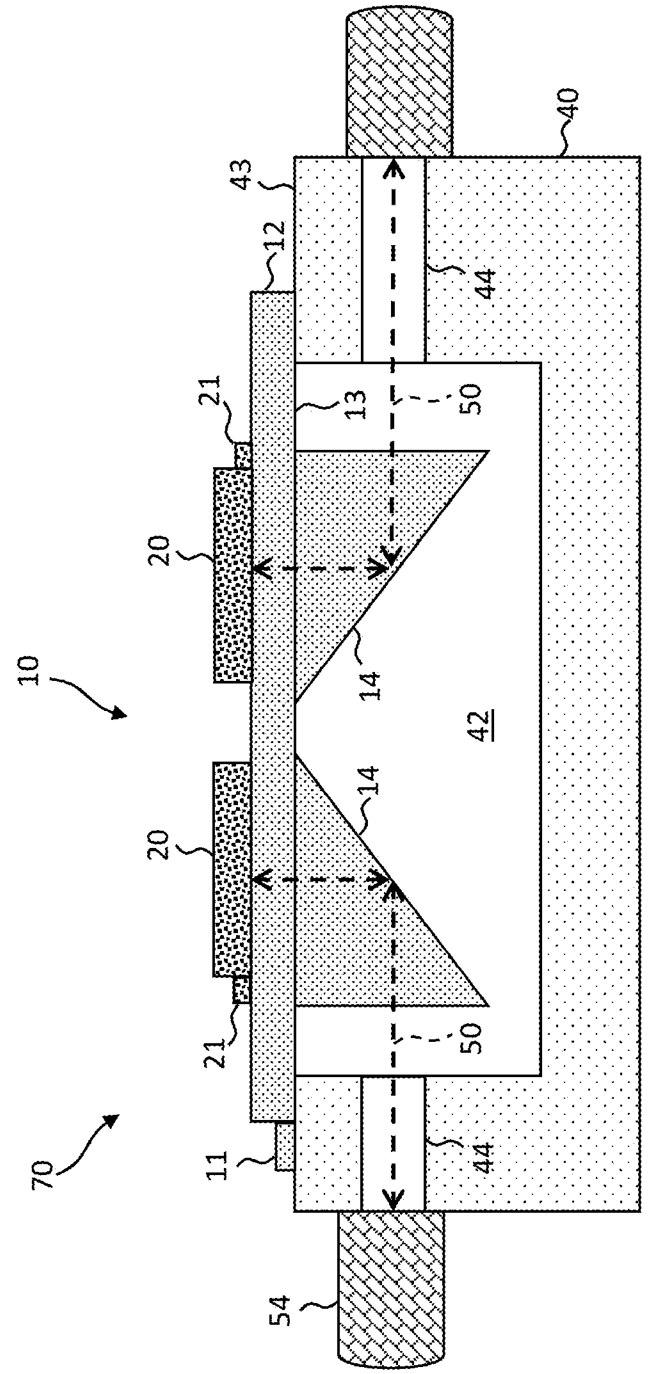

Moreover, in some embodiments, for micro-optical systems 70 and as shown in FIGS. 16A, 16B, and 14A-14C, light 50 can propagate through light pipes 44 disposed in system substrate 40 to and from micro-optical components 10 and light-active elements 20. As shown in FIG. 16A, micro-optical components 10 can comprise two or more micro-optical elements 14 disposed on micro-substrate 12 and arranged to modify light 50 from both cavity 42 and in free space (or through light pipes 44) disposed over system-substrate surface 43. Micro-optical component 10 can comprise multiple lenses, such as micro-lenses, or multiple reflectors, such as micro-prisms, or one or more lenses and one or more reflectors. Micro-optical elements 14 in a common micro-optical component 10 can have different sizes, for example as shown in FIG. 16B. FIG. 16B illustrates micro-optical component 10 with four micro-optical elements 14 (e.g., micro-prisms) with two micro-optical elements 14 on each side of two opposing sides of micro-substrate 12. Micro-optical elements 14 on one side of micro-substrate 12 can have a different size than micro-optical elements 14 on the opposing side of micro-substrate 12. In some embodiments, multiple micro-optical elements 14 of a micro-optical component 10 can be considered a single compound micro-optical element 14. Micro-optical component 10 can modify a single beam of light 50 or multiple beams of light 50, as shown in FIG. 16B. As shown in FIG. 16B and FIG. 16C, micro-optical components 10 having a single micro-substrate 12 can comprise two or more micro-optical elements 14 disposed on the single micro-substrate 12, optionally with two or more light-active elements 20 disposed on the single micro-substrate 12 on an opposite side of single micro-substrate 12 from micro-optical elements 14.

Figure 16D:
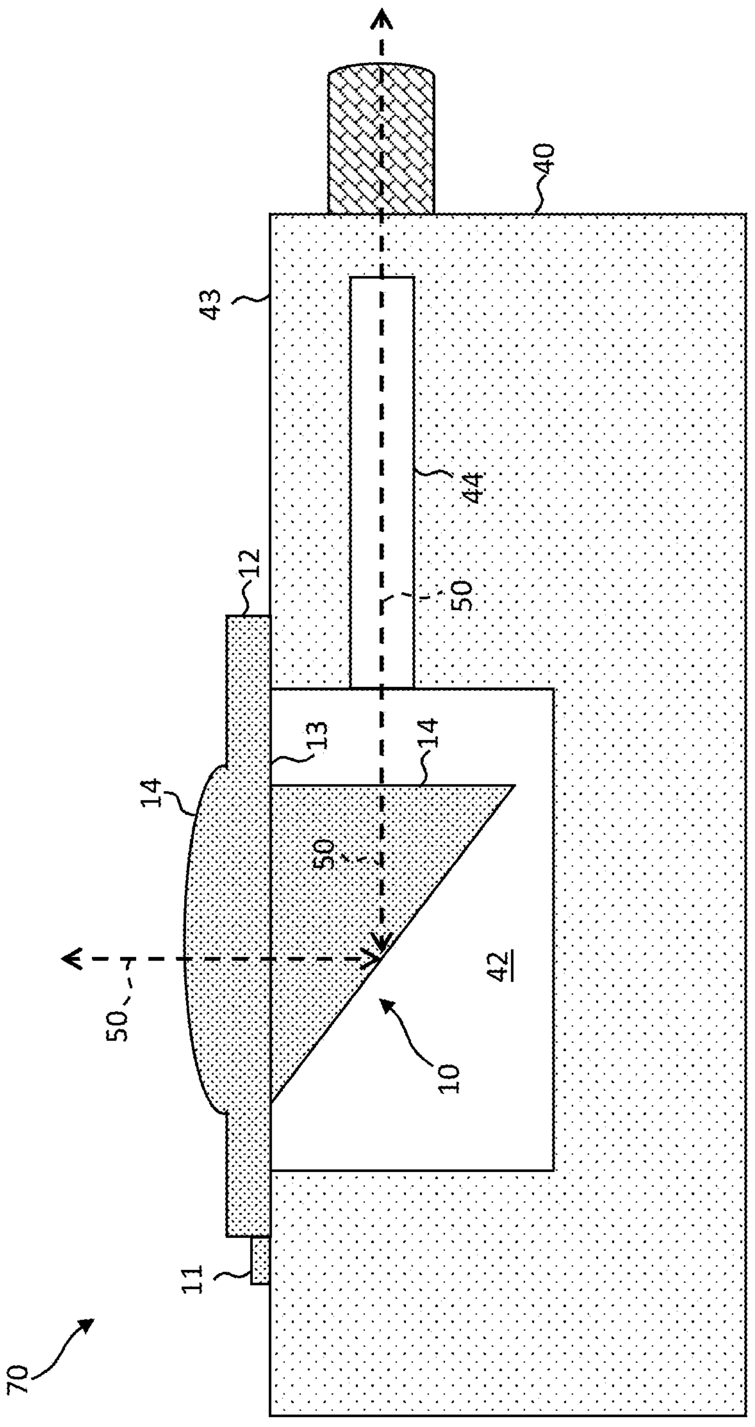
Figure 16E:
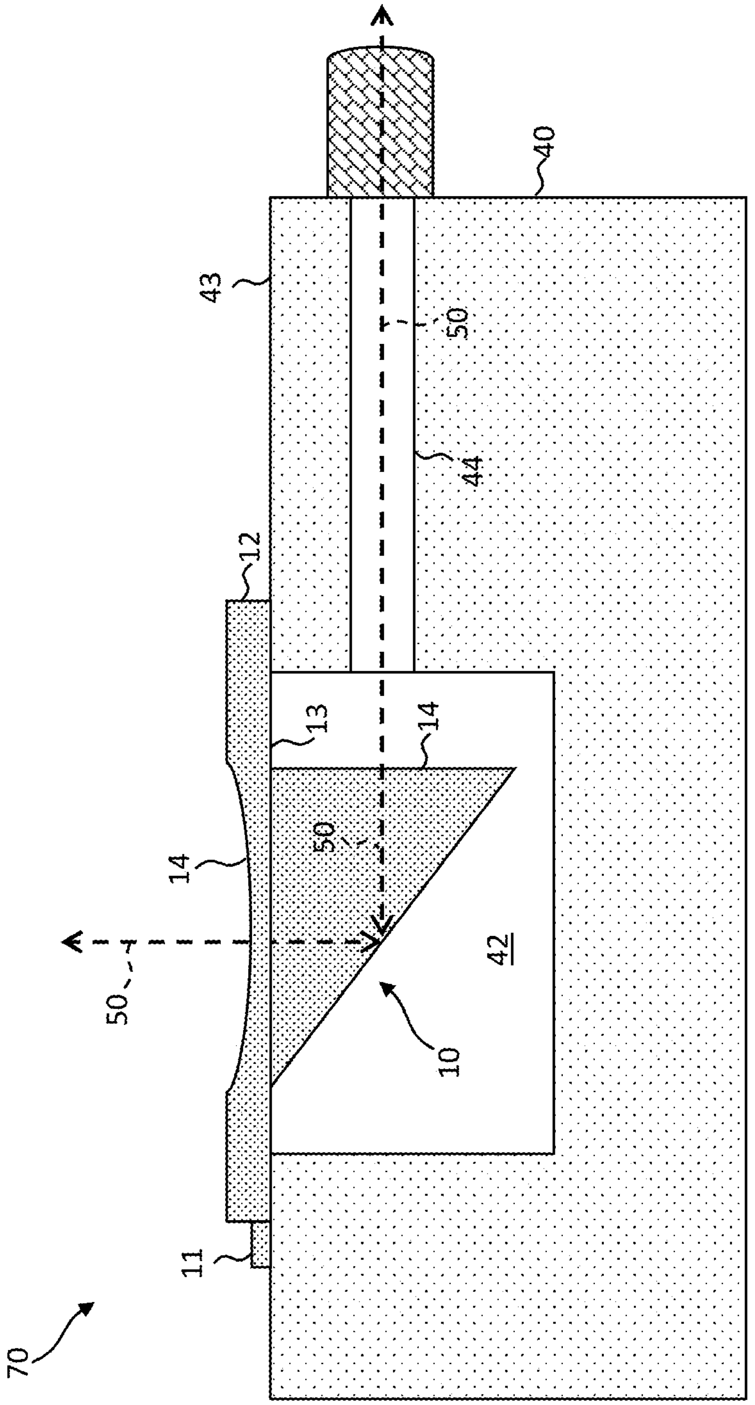
Figure 16F:
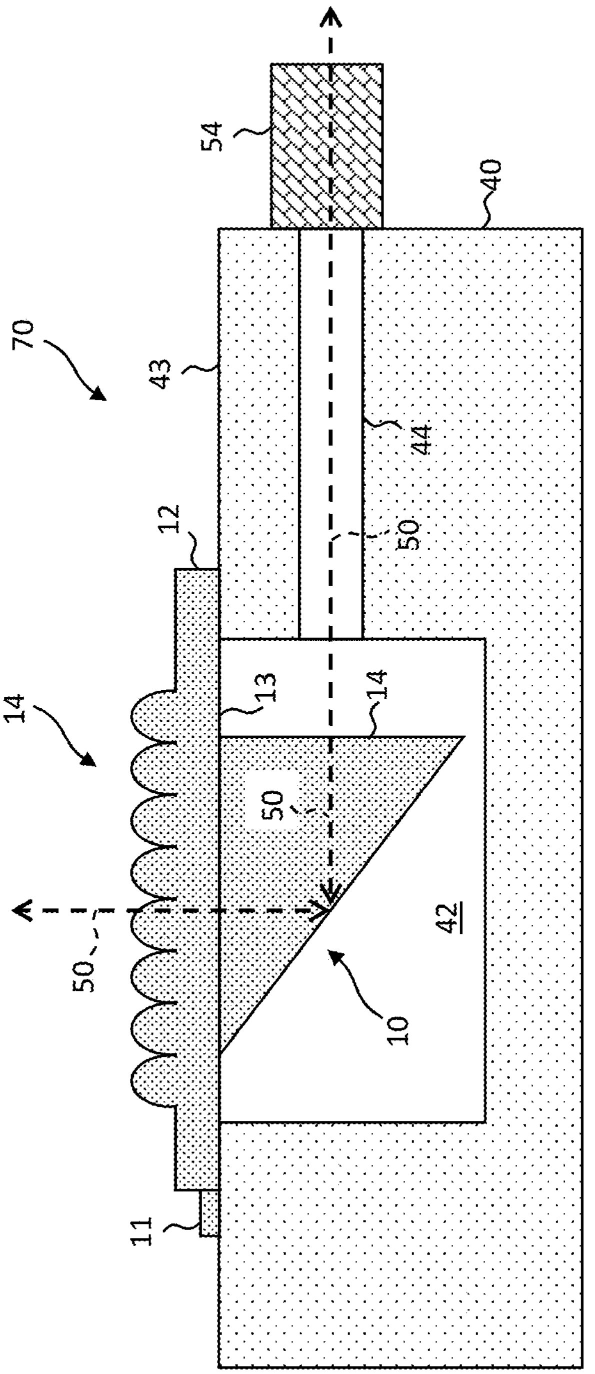
Figure 16G:
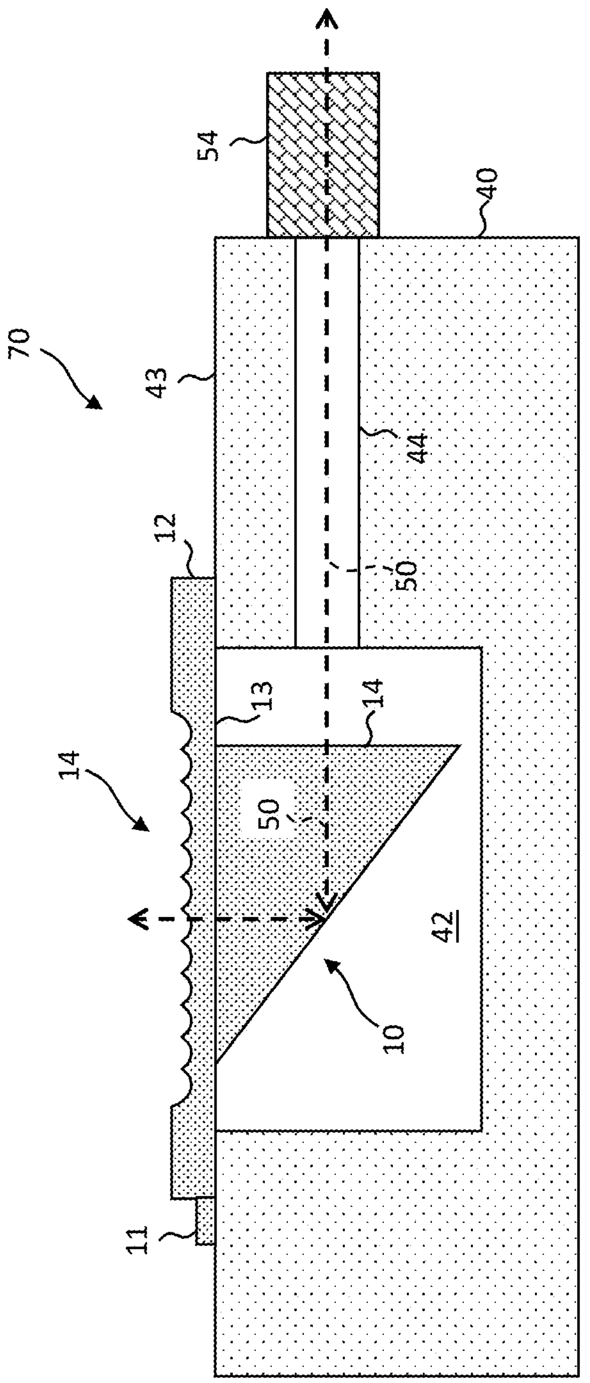
Figure 16H:
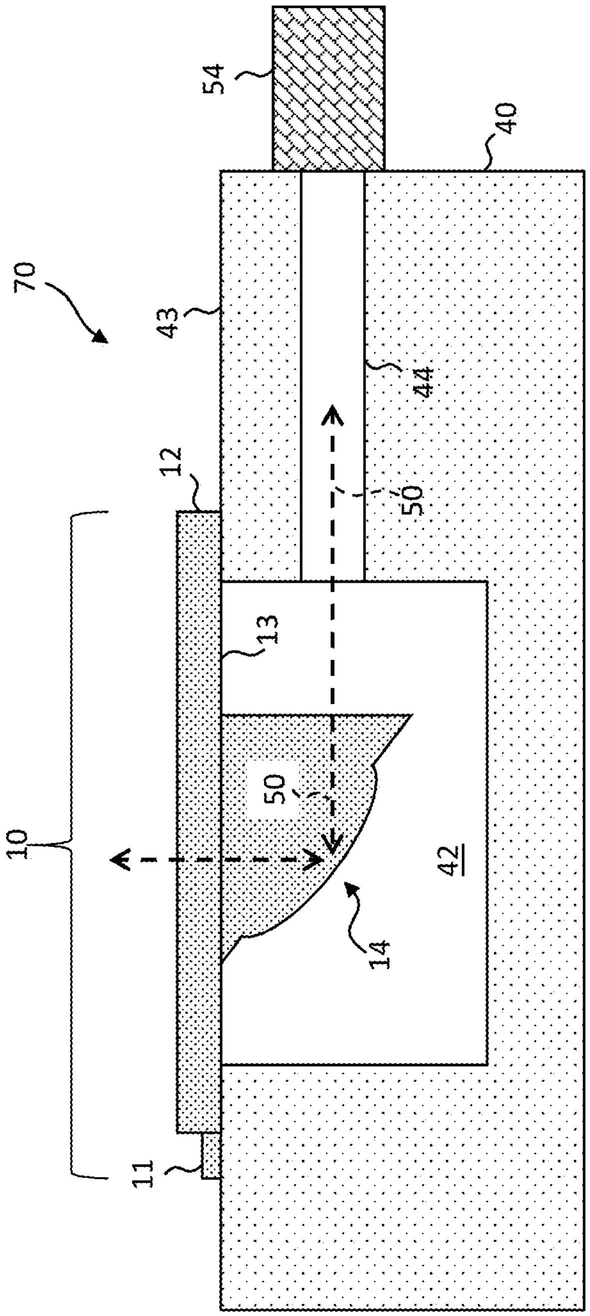
Figure 16I:
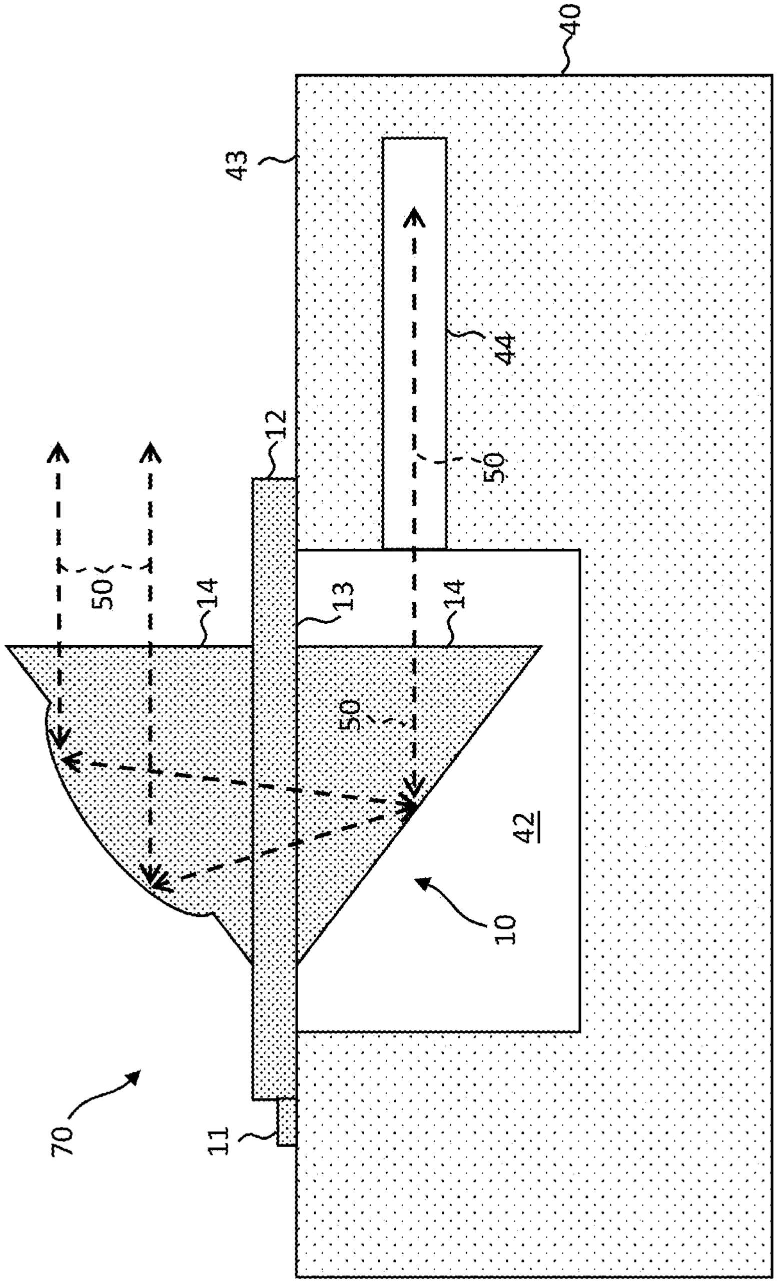
Figure 16J:
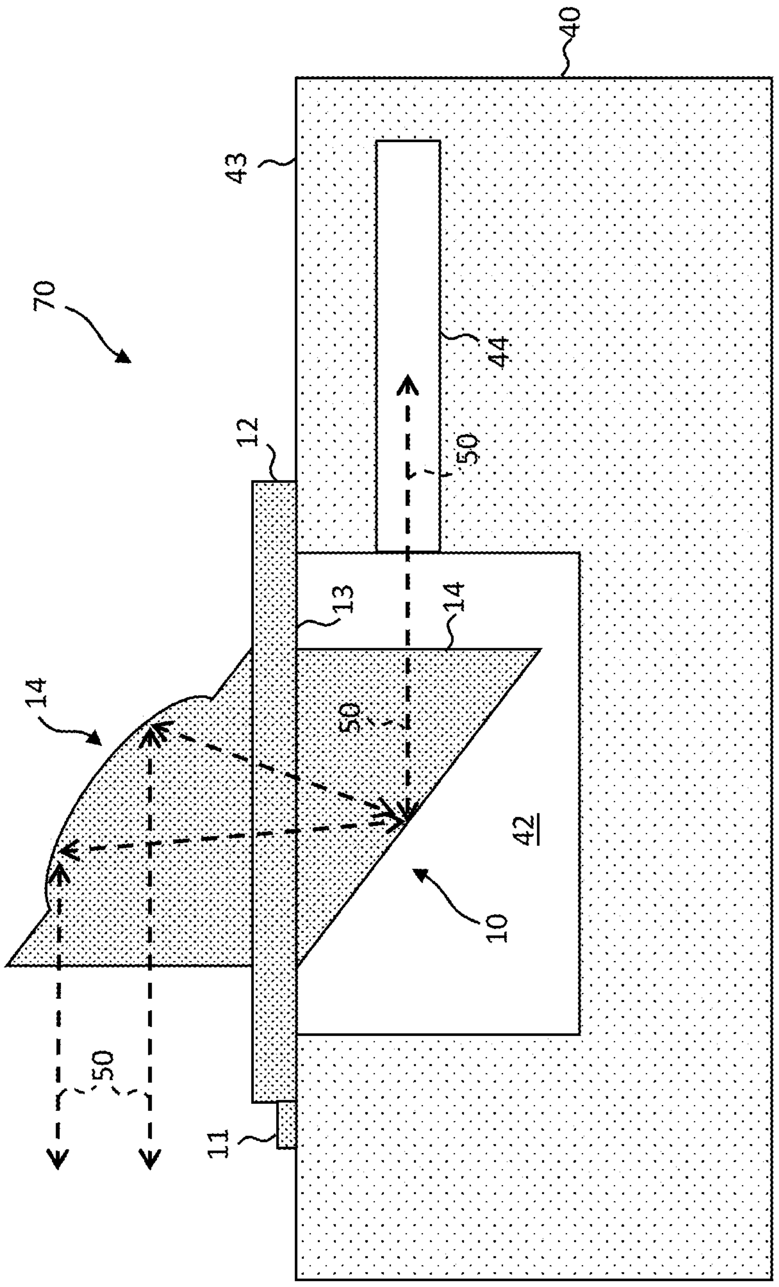
Figure 16K:
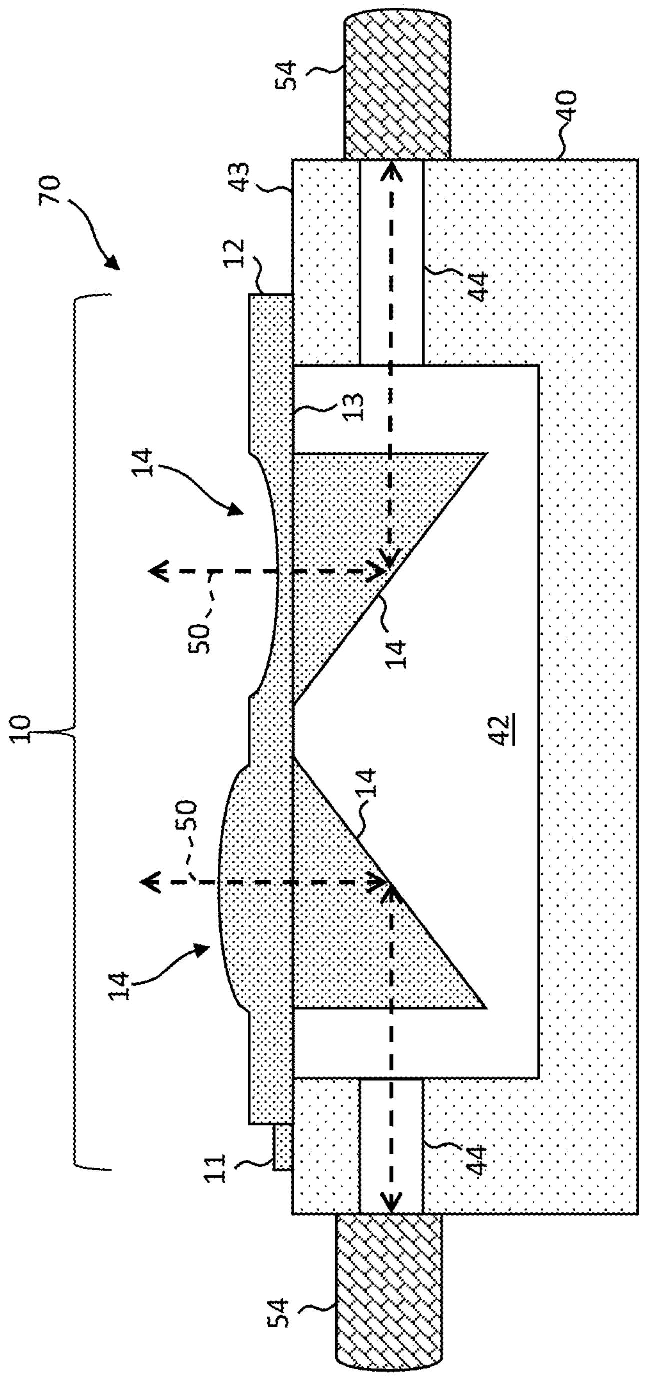
Figure 16L:
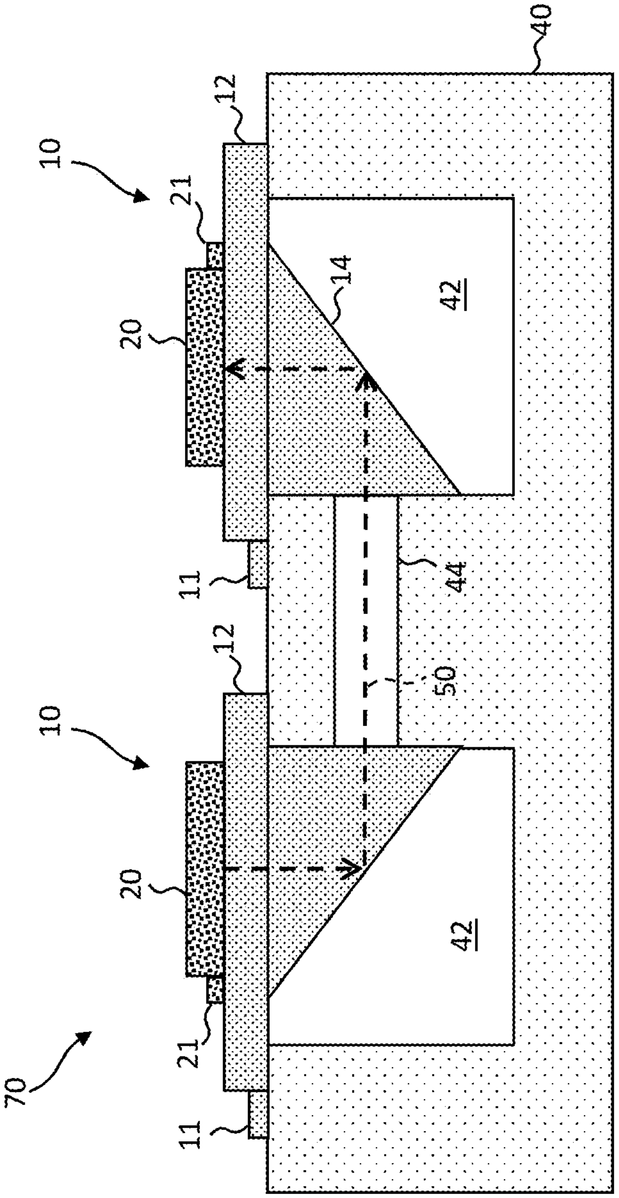

Micro-optical elements 14 can extend in a direction toward system substrate 40 (e.g., into system substrate 40) or away from system substrate 40 (e.g., away from system-substrate surface 43 in direction D as shown in FIG. 1C). More generally, light 50 can propagate through wave guides (e.g., light pipes 44) in system substrate 40 as shown in FIG. 14A, light 50 can propagate through wave guides (e.g., light pipes 44) disposed on system substrate 40 (e.g., through light pipes 44 disposed on system-substrate surface 43) as shown in FIG. 14B, or through free space over system-substrate surface 43 in a direction parallel to system-substrate surface 43, as shown in FIG. 15, or orthogonal to system-substrate surface 43, as shown in FIGS. 14A-14D and 16A-16C. Micro-optical elements 14 can redirect light 50 parallel to system-substrate surface 43, either over or within system substrate 40 or can redirect light 50 traveling parallel to system-substrate surface 43 to a direction orthogonal to system-substrate surface 43 (or vice versa). In some embodiments, and as shown in FIGS. 16A and 16B, micro-optical elements 14 can redirect light 50 propagating parallel to and above system-substrate surface 43 into light 50 propagating parallel to and within system substrate 40. As shown in FIGS. 16D-16G and 16I-16K, micro-optical elements 14 in a common micro-optical component 10 can be or include different types of micro-optical elements 14, e.g., a lens coupled with a reflector such as a prism and disposed in a common light path. FIG. 16D illustrates a convex lens and FIG. 16E illustrates a concave lens in combination with a prism. A convex lens can be a light-collimation or light-collecting lens (e.g., an optic) and a concave lens can be a diffusing or beam-expanding lens (e.g., an optic). In general, micro-optic element 14 can be any beam-shaping lens. FIG. 16F illustrates micro-optical element 14 comprising an array of convex lenslets. FIG. 16G illustrates micro-optical element 14 comprising an array of concave lenslets. FIGS. 16H-16K illustrate micro-optical element 14 comprising a prism with a non-flat (e.g., non-planar) reflective (or refractive) surface for providing light collimation or light beam-shaping. The non-flat surface can also comprise multiple light-shaping elements such as micro-lenslets. FIG. 16H illustrates a micro-optical element 14 of a micro-optical component 10 comprising a prism with a non-planar surface in cavity 42. FIG. 16I illustrates a micro-optical component 10 comprising a micro-optical element 14 that is a prism with all planar surfaces on a side of micro-substrate 12 in cavity 42 and comprising a prism with a non-planar reflective surface on an opposite side of micro-substrate 12 over system-substrate surface 43. FIG. 16J illustrates micro-optical component 10 similar to FIG. 16I except that the micro-optical element 14 prism with non-planar reflective surface reflects light 50 in an opposite horizontal direction over system-substrate surface 43. FIG. 16K illustrates micro-optical component 10 with both concave and convex micro-lenses shaping light 50 from respective prisms with planar reflective surfaces on an opposite side of micro-substrate 12 from the concave and convex micro-lenses. In general, light pipe 44 can convey (e.g., transmit) light 50, for example, to a fiber-optic cable 54 or, in some embodiments, to another micro-optical component 20 or micro-optical system 70, e.g., as shown in FIG. 15 and FIG. 16L. In FIG. 16L, for example, light-active elements 20 are a light emitter and a light sensor. In general, embodiments of the present disclosure can comprise micro-optical component 10 that include one or more different micro-optical elements 14 of different sizes and/or different types disposed in a common light 50 path. Micro-optical elements 14 can be disposed on a common side of micro-substrate 12, on opposite sides of micro-substrate 12, or both, e.g., where micro-optical component 10 comprises three, four, or more, micro-optical elements 14, for example as shown for example in FIGS. 16A-D. In some embodiments, micro-optical component 10 comprises three, four, or more, micro-optical elements 14. In some embodiments, micro-optical component 10 is structured to process, modify, redirect, or transform multiple light 50 beams, integrate multiple light 50 beams into a common light 50 beam, or divide a light 50 beam into multiple separate light 50 beams.

In some embodiments, cavity 42 can be filled or partially filled with a material, such as an optical-index-matching material to reduce stray reflections from surfaces of cavity 42 or micro-optical element 14. The optical-index-matching material can be a curable polymer disposed as a liquid in cavity 42 before or after micro-optical component 10 is disposed on system substrate 40 and micro-optical element 14 is disposed in cavity 42, e.g., as shown in FIG. 12A, and then cured.

In various embodiments, system substrate 40 can be a semiconductor (e.g., silicon or a compound semiconductor), glass, polymer, resin, ceramic, sapphire, or a printed circuit board. Micro-electronic components 22 disposed on system substrate 40 can be integrated circuits, e.g., micro-transfer printed unpackaged bare die, and can process electrical signals received from or provided to light-active elements 20. Micro-electronic components 22 can be constructed using photolithographic processes on silicon (or other semiconductor) wafers. Light-active elements 20 can be constructed using photolithographic processes for compound semiconductor wafers such as InP, GaAs, GaN and various alloys thereof.

In general, components of the present disclosure can be assembled using micro-transfer printing to remove components (e.g., micro-optical components 10, light-active elements 20, and micro-electronic components 22) from a component source wafer 30 and disposing them on a system substrate 40, thereby breaking (e.g., fracturing) or separating component tethers 11 used to hold the component in place over an etched sacrificial portion 34 or cavity 42 (e.g., gap 36) of the component source wafer 30 to an anchor portion (anchor 32) of the component source wafer 30. Micro-transfer printing is useful for micro-assembling micron-scale components. For example, any of micro-optical components 10, light-active elements 20, and micro-electronic components 22 can have a lateral extent over system-substrate surface 43 of no greater than two hundred μm, no greater than one hundred μm, no greater than fifty μm, no greater than twenty μm, no greater than ten μm, no greater than five μm, no greater than three μm, or no greater than two μm and a thickness no greater than one hundred μm, no greater than fifty μm, no greater than twenty μm, no greater than ten μm, no greater than five μm, no greater than two μm, or no greater than one micron.

Figure 17A:
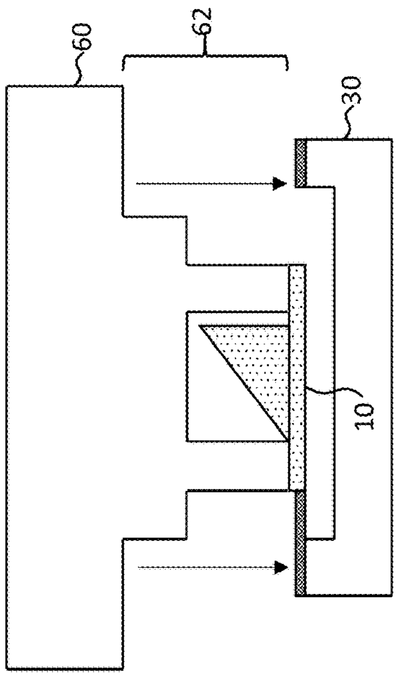
FIGS. 17A-17D are cross sections of successive structures in constructing a micro-optical system according to illustrative embodiments of the present disclosure.
Figure 17B:
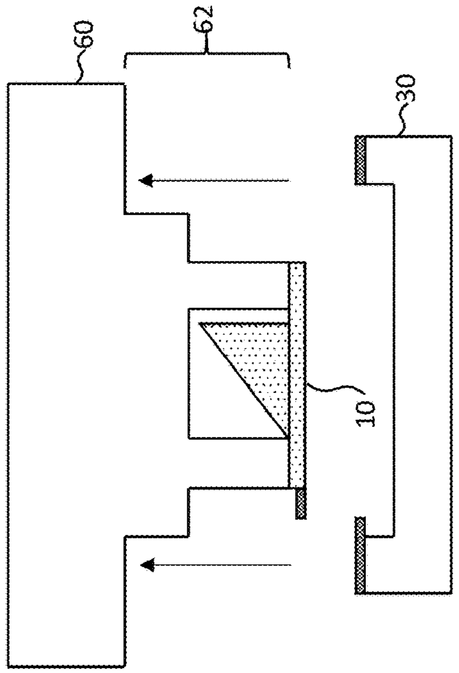
Figure 17C:
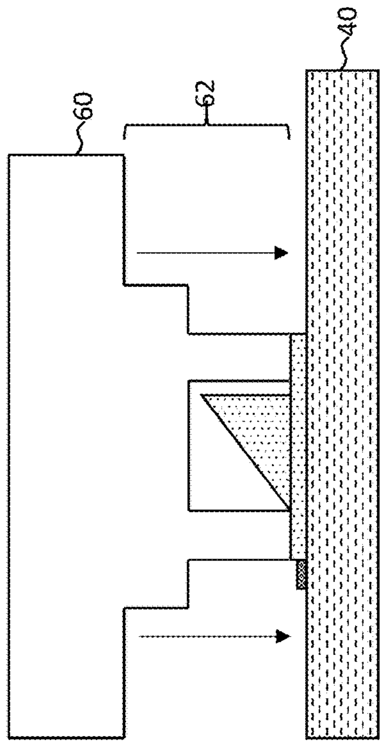
Figure 17D:
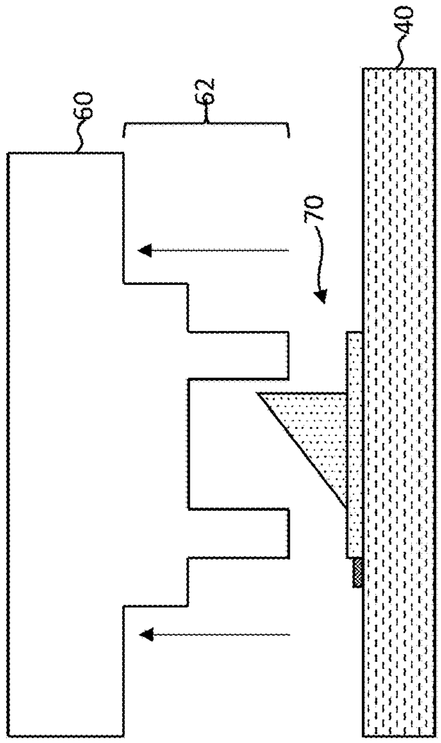
Figure 18A:
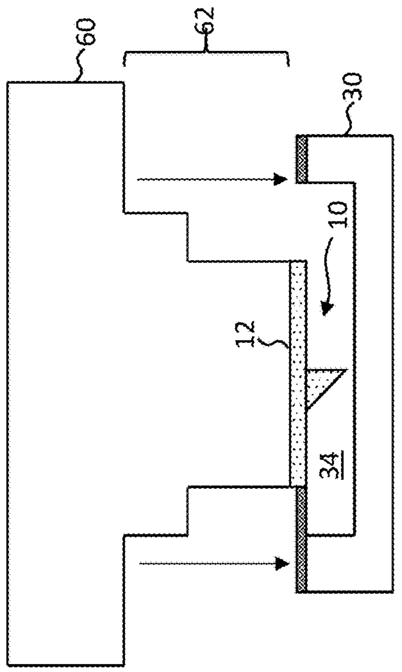
FIGS. 18A-18D are cross sections of successive structures in constructing a micro-optical system according to illustrative embodiments of the present disclosure.
Figure 18B:
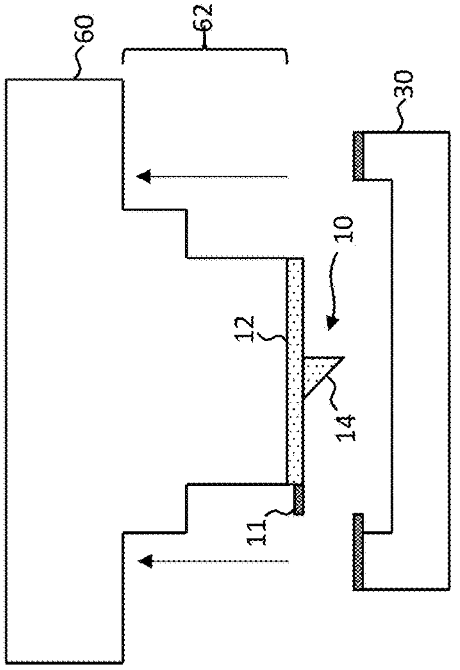
Figure 18C:
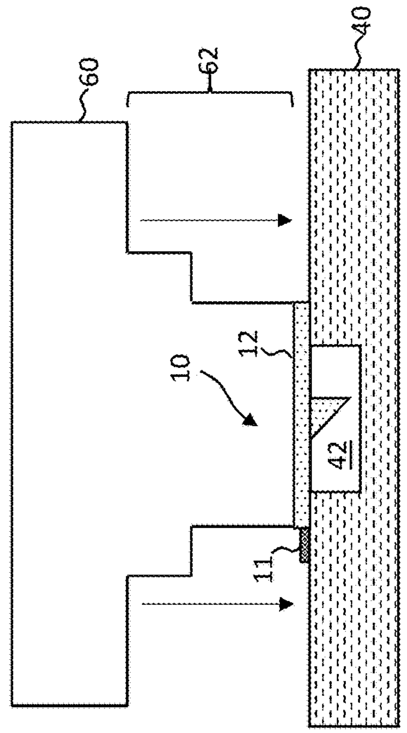
Figure 18D:
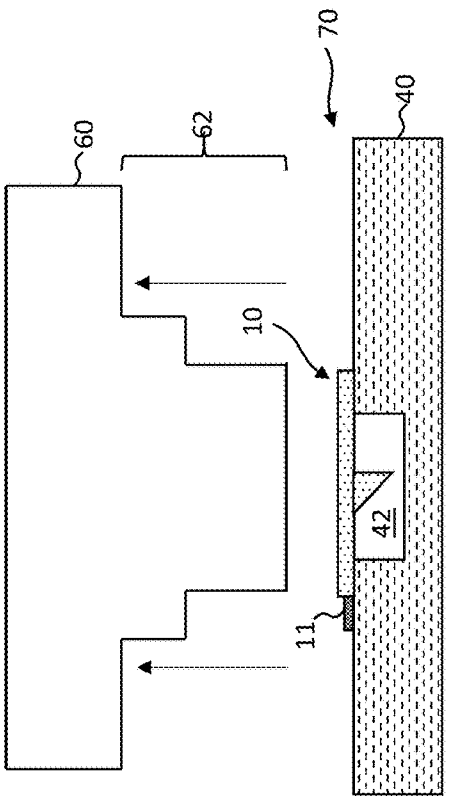

FIGS. 17A-FIG. 20 illustrate methods and structures useful in constructing embodiments of the present disclosure. A source wafer is provided for each device in micro-optical system 70 in step 100 and components (e.g., any one or more of micro-optical component 10, micro-electronic component 22, and light-active element 20) are released from their respective source wafers (e.g., micro-optical component source wafer 30) in step 110. A micro-transfer-printing stamp 60 is provided in step 120 and contacted to the component (e.g., micro-optical component 10) in step 130 and as shown in FIG. 17A. Micro-transfer printing stamp 60 can comprise a stamp post 62 with a structured distal end that contacts micro-substrate 12, optionally without contacting micro-optical element 14, for example contacting micro-substrate area 16 exclusive of micro-optical element area 18, avoiding possible marring of micro-optical element 14. In step 140, the component (e.g., micro-optical component 10) is removed from component source wafer 30 with micro-transfer-printing stamp 60 as shown in FIG. 17B, fracturing or separating component tether 11. System substrate 40 is provided in step 160 and the component (e.g., micro-optical component 10) is disposed on system substrate 40 with micro-transfer-printing stamp 60 in step 170 as shown in FIG. 17C. Micro-transfer printing stamp 60 can then be removed as shown in FIG. 17D in step 180 to construct micro-optical system 70. An adhesive layer is optionally disposed on system substrate 40 before micro-transfer printing the components to adhere the components to system-substrate surface 43. The adhesive layer can be cured after micro-transfer printing the components to the adhesive.

FIGS. 17A-17D illustrate a process for micro-assembling micro-optical component 10 onto system substrate 40 where micro-optical element 14 extends in a direction away from system substrate 40. FIGS. 18A-18D illustrate similar steps and processes for micro-assembling micro-optical component 10 onto system substrate 40 where micro-optical element 14 extends in a direction toward system substrate 40, e.g., into and in alignment with cavity 42 of system substrate 40. In this process, the distal end of stamp post 62 of micro-transfer printing stamp 60 need not be structured and can be flat, as shown in FIGS. 18A-18D and can contact a side of micro-substrate 12 opposite micro-optical element 14.

Figure 19A:
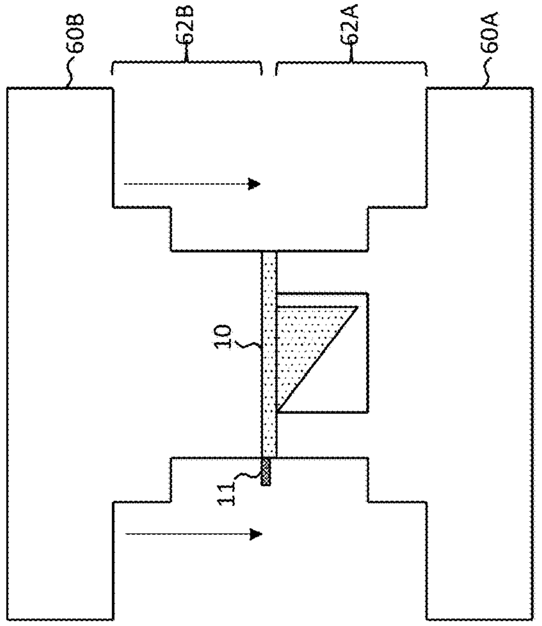
FIGS. 19A-19C are cross sections of successive structures in constructing a micro-optical system using stamp-to-stamp transfer according to illustrative embodiments of the present disclosure.
Figure 19B:
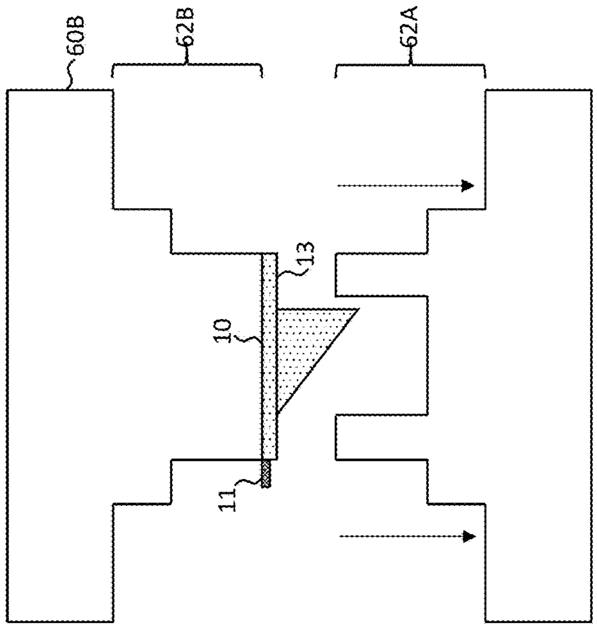
Figure 19C:
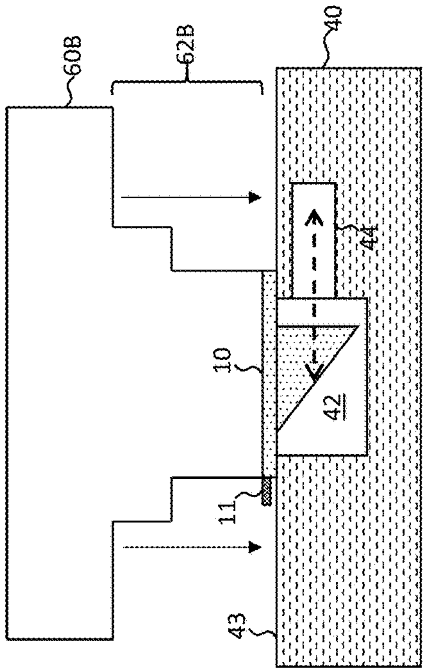
Figure 20:
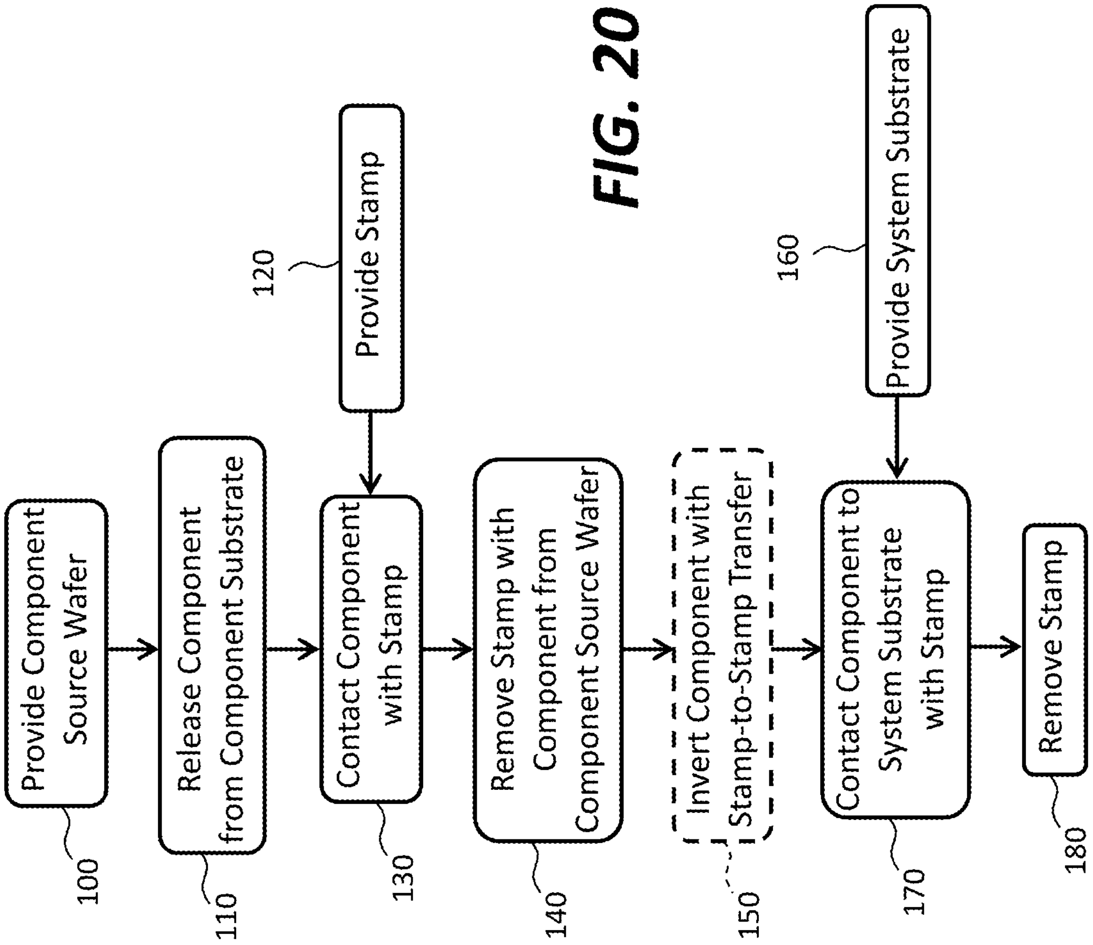
FIGS. 20 and 21 are flow diagrams according to illustrative embodiments of the present disclosure.

In some embodiments, it can be desirable to construct micro-optical element 14 extending away from component source wafer 30 (for example due to fabrication constraints) but to dispose it onto system substrate 40 in cavity 42. In some such embodiments, micro-optical component 10 can be inverted (e.g., flipped over) after picking up micro-optical component 10 with micro-transfer printing stamp 60 and before printing micro-optical component 10 onto system substrate 40. This inversion can be accomplished with a stamp-to-stamp transfer. In such a transfer, a first micro-transfer printing stamp 60A is used to pick up micro-optical component 10 from component source wafer 30 (step 140 shown in FIG. 17B, e.g., by contacting micro-substrate surface 13 with first stamp post 62A), a second micro-transfer printing stamp 60B contacts a side of micro-substrate 12 opposite micro-substrate surface 13 with second stamp post 62B to transfer micro-optical component 10 from first micro-transfer printing stamp 60A to second micro-transfer printing stamp 60B, as shown in FIG. 19A in optional step 150. First micro-transfer printing stamp 60A is removed as shown in FIG. 19B and second micro-transfer printing stamp 60B then contacts micro-optical component 10 with second stamp post 62B to adhere micro-substrate surface 13 to system-substrate surface 43 as shown in FIG. 19C in step 170. Second micro-transfer printing stamp 60B is then removed in step 180.

Figure 21:
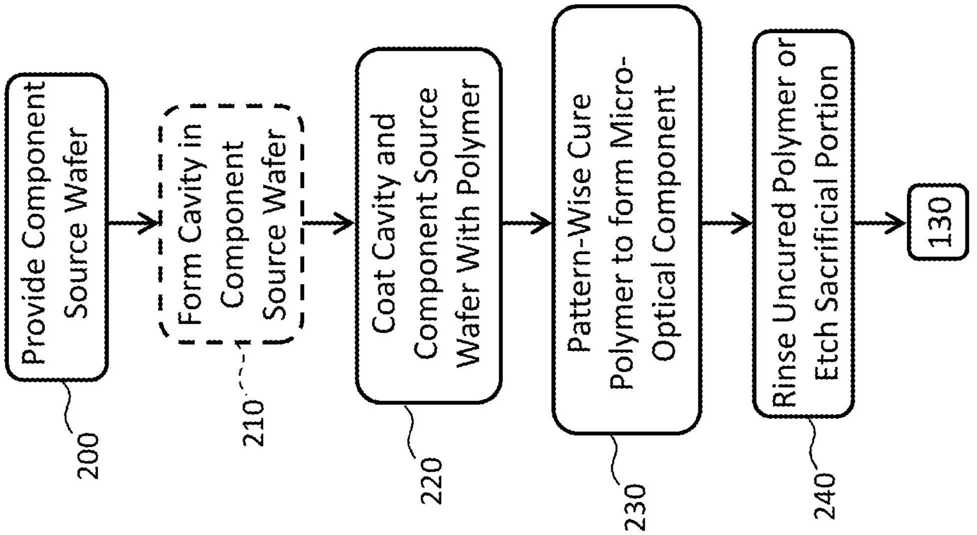

Micro-optical component 10 can be constructed in any of a variety of ways, examples of which are illustrated in FIGS. 10A-10D, FIGS. 11A-11D, and FIGS. 12-12F and in the flow diagram of FIG. 21. With reference to these figures, component source wafer 30 is provided in step 200, for example a semiconductor wafer such as silicon or other substrate as is known in the semiconductor and display industries. Optionally, cavity 42 is formed in micro-optical component source wafer 30 in step 210. In some embodiments, cavity 42 is empty. In other embodiments, cavity 42 is filled with a sacrificial material to form sacrificial portion 34. In some embodiments, micro-optical component source wafer 30 is coated with a liquid material such as a polymer in step 220 (e.g., a liquid curable and uncured polymer 37 such as a resin, epoxy, or photoresist). Liquid uncured polymer 37 can be, but is not necessarily, soft-cured. The coating can be done with, for example, spray coating, spin coating, slot coating, hopper coating, or with an inkjet device. Micro-optical component source wafer 30 can be planarized by the liquid uncured polymer 37 coating and can fill any cavity 42, forming sacrificial portion 34. FIG. 9A illustrates embodiments in which a cavity 42 is filled with liquid uncured polymer 37 to form sacrificial portion 34. FIG. 10A, FIG. 11A, and FIG. 12A illustrate embodiments in which a cavity 42 is filled with a solid sacrificial material to form sacrificial portion 34. Where cavity 42 is filled with a solid sacrificial material, a protective layer 35 (e.g., a transparent inorganic dielectric or a reflective metal) can be patterned over sacrificial portion 34.

In step 230, micro-optical element 14 or micro-substrate 12 (or both, comprised in micro-optical component 10) are formed. In some embodiments, micro-optical element 14 or micro-substrate 12, or both, are formed using two-photon polymerization to cure liquid uncured polymer 37 to make a three-dimensional structure forming a solid structure comprising cured polymer 38, for example as shown in FIG. 9B. This technique has an advantage in that structures (e.g., micro-optical elements 14) can be formed in cavity 42. In some embodiments, micro-optical element 14 or micro-substrate 12, or both, are formed using an imprint stamp 61 (e.g., using nanoimprint lithography) to form a three-dimensional structure in a liquid uncured polymer 37 over component source wafer 30 that is cured to form a cured polymer 38 structure, for example as shown in FIG. 10B and FIG. 11B. The three-dimensional structure can form any one or more of micro-substrate 12, micro-optical element 14, and component tether 11. Where a protective layer 35 is present (shown in FIG. 11A), protective layer 35 can be patterned to form component tether 11. Component tether 11 can comprise protective layer 35, cured polymer 38, or both. Protective layer 35 can also be provided over micro-optical element 14 and micro-substrate 12 to protect them, if desired and as shown in FIG. 11C. Protective layer 35 can also provide optical benefits, for example a layer with a different optical index from micro-optical element 14 or an anti-reflection layer. Protective layer 35 can comprise multiple layers, for example comprising different materials or layers with different optical indices.

Once liquid uncured polymer 37 is cured to make the three-dimensional cured polymer 38 structure, sacrificial portion 34 can be removed in step 240 to form gap 36, for example by rinsing (e.g., where two-photon polymerization was used as in FIG. 9D) or by etching (where sacrificial portion 34 comprises a solid material as in FIG. 10D and FIG. 11D), to form a print-ready micro-optical component 10.

In some embodiments and as shown in FIGS. 12A-12D, a mold (e.g., a form, depression, or pit) can be etched into sacrificial portion 34 in step 210 and as shown in FIG. 12B. For example, sacrificial portion 34 can comprise an anisotropically etchable material such as silicon with etch planes defined by the crystal structure of sacrificial portion 34. A material of micro-optical component 10 can be deposited in the mold and over sacrificial portion 34, for example a polymer that is subsequently cured as in step 220 or, in some embodiments, an inorganic material such as silicon dioxide or silicon nitride is deposited and patterned, as shown in FIG. 12C in step 230. Sacrificial portion 34 can then be etched to form gap 36 and provide micro-optical component 10 ready for micro-transfer printing, as shown in FIG. 12D.

In some embodiments, sacrificial portion 34 can be made by depositing a liquid, curable polymer in a cavity 42 in micro-optical component source substrate 30, for example as in FIG. 9A. Liquid, curable polymer 37 can then be imprinted with imprint stamp 61 as in FIG. 12F, cured, and imprint stamp 61 removed to form the mold shown in FIG. 12B. If an inorganic material (such as silicon dioxide) is used to form micro-optical component 10, the mold can be differentially etched from micro-optical component 10 to release micro-optical component 10. This approach has the advantage of enabling mold structures (shapes) that are not readily constructed using photolithography and using component source wafer 30 materials that are not anisotropically etchable such as glass. Thus, such methods provide micro-optical components 10 of a wider variety of shapes and using cheaper materials processed in less time.

The components (e.g., micro-optical components 10) transfer printed to system substrate 40 are non-native to system substrate 40. In embodiments in which system substrate 40 is a semiconductor (e.g., silicon), a circuit (e.g., a native micro-electronic component 24 as shown in FIG. 15) can be constructed in or on and native to system substrate 40, rather than micro-transfer printed to system substrate 40 as shown with non-native micro-electronic components 22 in FIG. 15 to process electrical signals received from or provided to light-active elements 20.

As used herein, a device native to a substrate is formed on the substrate, for example by photolithographically processing layers of material that were directly deposited on the substrate, for example by sputtering or vapor deposition. A device formed on a native substrate (e.g., component source substrate 30) and then transferred to a second substrate is non-native to the second substrate (e.g., system substrate 40).

Embodiments of the present disclosure provide devices and methods for micro-assembling heterogeneous components, e.g., micro-optical components 10, non-native micro-electronic components 22, and light-active elements 20, that can all comprise materials different from a material of system substrate 40. In some embodiments, heterogeneous micro-optical system 70 comprises different materials, e.g., different components comprising semiconductor materials such as different compound semiconductor materials such as GaAs, InP, GaN disposed on a common system substrate 40, for example glass, ceramic, printed-circuit boards, or silicon. System substrate 40 can comprise native semiconductor circuits. Using non-native materials enables the best material to be used for each component and avoids component photolithographic processing incompatibilities.

Various embodiments of structures and methods are described herein that include (e.g., were made by) printing components such as micro-optical components 10. Printing may include or be micro-transfer printing. As used herein, micro-transfer-printing involves using a transfer device (e.g., a visco-elastic elastomeric micro-transfer printing stamp 60, such as a polydimethylsiloxane (PDMS) micro-transfer printing stamp 60) to transfer a component using controlled adhesion. For example, an exemplary transfer device can use kinetic, rate-dependent, or shear-assisted control of adhesion between a transfer device (e.g., micro-transfer printing stamp 60) and a component such as micro-optical component 10. It is contemplated that, in certain embodiments, where a method is described as including micro-transfer-printing a component, other analogous embodiments exist using a different transfer method. In methods according to certain embodiments, a vacuum tool, electrostatic tool, or other transfer device is used to print a micro-optical component 10, for example by contacting micro-substrate 12 in a micro-substrate area 16 exclusive of micro-optical element area 18.

System substrate 40 can be a module substrate, for example of a micro-transfer printable module. For example, printing (e.g., micro-transfer printing) and other processing (e.g., photolithographic processing) can be used in combination to assemble and optically interconnect micro-optical components 10 on system substrate 40 to form a module that itself can be transferred (e.g., printed, such as micro-transfer printed) to another, larger target substrate. In some such embodiments where system substrate 40 is a module substrate, system substrate 40 can be native to a module source wafer. System substrate 40 can then be released from the module source wafer by etching (e.g., with gas or liquid etchant) (e.g., such that it is suspended from the module source wafer by a tether) and then printed (e.g., with an elastomeric stamp). FIG. 15 illustrates an arrangement disposed on and in system substrate 40 which could be itself a printable module.

In some embodiments, micro-substrate 12 comprises a micro-optical element 14 disposed therein. For example, micro-substrate 12 and micro-optical element 14 can be integral with each other.

In some embodiments, a stamp used to print micro-optical component 10 has a structured post to avoid contacting delicate micro-optical element 14, which could damage it or otherwise impair its subsequent performance. For example, a stamp may have a suction cup profile. In some embodiments, micro-optical component 10 having micro-optical element 14 extending from micro-substrate 12 towards component source wafer 30 allows for stamps with unstructured posts, or other analogous transfer devices, to be used without risking damage to micro-optical element 14.

Examples of micro-transfer printing processes suitable for printing components onto system substrates 40 are described in U.S. Pat. No. 8,722,458 entitled Optical Systems Fabricated by Printing-Based Assembly, U.S. Pat. No. 9,362,113 entitled Engineered Substrates for Semiconductor Epitaxy and Methods of Fabricating the Same, U.S. Pat. No. 9,358,775 entitled Apparatus and Methods for Micro-Transfer-Printing, U.S. patent application Ser. No. 14/822,868, filed on Aug. 10, 2015, entitled Compound Micro-Assembly Strategies and Devices, and U.S. Pat. No. 9,704,821 entitled Stamp with Structured Posts, each of which is hereby incorporated by reference herein in its entirety.

It is contemplated that systems, devices, methods, and processes of the disclosure encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems according to certain embodiments of the present disclosure that consist essentially of, or consist of, the recited components, and that there are processes and methods according to certain embodiments of the present disclosure that consist essentially of, or consist of, the recited processing steps.

It should be understood that the order of steps or order for performing certain actions is immaterial so long as operability is not lost. Moreover, two or more steps or actions may be conducted simultaneously.

Certain embodiments of the present disclosure were described above. It is, however, expressly noted that the present disclosure is not limited to those embodiments, but rather the intention is that additions and modifications to what was expressly described in the present disclosure are also included within the scope of the disclosure. Moreover, it is to be understood that the features of the various embodiments described in the present disclosure were not mutually exclusive and can exist in various combinations and permutations, even if such combinations or permutations were not made express, without departing from the spirit and scope of the disclosure. Having described certain implementations of heterogeneous wafer structures, heterogeneous semiconductor structures, methods of their fabrication, and methods of their use, it will now become apparent to one of skill in the art that other implementations incorporating the concepts of the disclosure may be used. Therefore, the disclosure should not be limited to certain implementations, but rather should be limited only by the spirit and scope of the following claims.

PARTS LIST

D orthogonal direction
H height/thickness
X dimension/direction
Y dimension/direction
10 micro-optical component
11 component tether
12 micro-substrate
13 micro-substrate surface
14 micro-optical element
15 micro-alignment mark
16 micro-substrate area
18 micro-optical element area
19 reflective coating
20 light-active element
21 light-active element tether
22 micro-electronic component/non-native micro-electronic component
24 native micro-electronic component
26 electrode
30 micro-optical component source wafer
32 anchor/anchor portions
34 sacrificial portion/sacrificial material
35 protective layer
36 gap
37 uncured polymer
38 cured polymer
39 radiation
40 system substrate
42 cavity
43 system-substrate surface
44 light pipe
46 adhesive
50 light/light beam/light ray/photon
54 fiber-optic cable
60 micro-transfer-printing stamp
60A first micro-transfer printing stamp
60B second micro-transfer printing stamp
61 imprint stamp
62 stamp post
62A first stamp post
62B second stamp post
70 micro-optical system
100 provide component source wafer step
110 release component from component source wafer step
120 provide stamp step
130 contact component on with stamp step
140 remove component from component source wafer with stamp step
150 invert component with stamp-to-stamp transfer step
160 provide system substrate step
170 contact component to system substrate with stamp step
180 remove stamp step
200 provide component source wafer step
210 form cavity in component source wafer step
220 coat cavity and component source wafer with polymer step
230 pattern-wise cure polymer to form micro-optical component step
240 rinse uncured polymer/etch sacrificial portion step

What is claimed is:

1. A micro-optical component, comprising:
a micro-substrate having a micro-substrate surface;
a micro-optical element disposed on the micro-substrate surface, wherein the micro-optical element is a passive optical component;
at least a portion of a component tether physically attached to the micro-substrate and extending away from and beyond the micro-substrate,
wherein the micro-optical component has a thickness no greater than 250 μm,
wherein the micro-substrate, the at least a portion of a component tether, and the micro-optical element are unitary, monolithic, and comprise a common material, and
wherein the micro-optical element extends away from and beyond the micro-substrate surface in a direction orthogonal to the micro-substrate surface.

2. The micro-optical component of claim 1, wherein the at least a portion of a component tether is a broken or separated component tether.

3. The micro-optical component of claim 1, wherein the micro-optical element is disposed on a surface of the micro-substrate and the micro-substrate extends beyond the micro-optical element in only one dimension parallel to the surface.

4. The micro-optical component of claim 1, wherein the micro-optical element is disposed on a surface of the micro-substrate, the micro-substrate extends beyond the micro-optical element in two dimensions parallel to the surface, and the micro-substrate is thinner than the micro-optical element.

5. The micro-optical component of claim 1, wherein the micro-optical element is a reflection element, a refraction element, a diffraction element, a frequency filter, a phase-change element, a polarization detector element, a polarization modifier element, a frequency converter, or any combination thereof.

6. The micro-optical component of claim 1, further comprising a second micro-optical element formed in the micro-substrate that is operable to redirect, process, or modify light.

7. The micro-optical component of claim 1, comprising a light-generating element or a light-responsive element disposed on the micro-substrate on a side of the micro-substrate opposite the micro-optical element.

8. The micro-optical component of claim 7, wherein the light-generating element is a laser or light-emitting diode and the light-responsive element is a photodiode.

9. The micro-optical component of claim 1, wherein the micro-substrate comprises a micro-alignment mark disposed in the micro-substrate area exclusive of a micro-optical element area in contact with the micro-substrate.

10. The micro-optical component of claim 1, wherein the micro-substrate is substantially transparent to light modified by the micro-optical element.

11. The micro-optical component of claim 1, wherein the micro-substrate is substantially opaque to, reflects, filters, or absorbs light modified by the micro-optical element.

12. The micro-optical component of claim 1, wherein (i) the micro-substrate has a micro-substrate area no greater than 100,000 $\mu m^2$, (ii) the micro-substrate has a large aspect ratio (length to width), (iii) (a) the micro-substrate has a width of no greater than 50 μm and a length of no less than 100 μm, (b) the micro-substrate has a width of no greater than 100 μm and a length of no less than 500 μm, (c) the micro-substrate has a width of no greater than 200 μm and a length of no less than 400 μm, or (d) any combination of (a), (b), and (c), or (iv) any combination of (i), (ii), and (iii).

13. The micro-optical component of claim 1, comprising a protective layer or protective layers.

14. The micro-optical component of claim 13, wherein the protective layer or protective layers are constructed to desirably interact with light.

15. The micro-optical component of claim 1, comprising a protective layer or protective layers and wherein the component tether comprises a portion of the protective layer.

16. The micro-optical component of claim 1, wherein the component tether is a hybrid organic-inorganic tether.

17. A micro-optical system, comprising:

a system substrate; and the micro-optical component according to claim 1 disposed on the system substrate, wherein the micro-optical component is non-native to the system substrate.

18. The micro-optical component of claim 1, wherein the micro-optical component has a length and width each no greater than 250 μm.

19. A micro-optical component, comprising:

a micro-substrate;

a micro-optical element disposed on the micro-substrate; and at least a portion of a component tether physically attached to the micro-substrate extending away from and beyond the micro-substrate, or physically attached to the micro-optical element and extending away from and beyond the micro-optical element, wherein the at least a portion of a component tether comprises a cured polymer, wherein the micro-optical component has a thickness no greater than 250 μm.

20. The micro-optical component according to claim 1, wherein the common material is a cured polymer.

21. The micro-optical component according to claim 1, wherein the micro-optical element is a first micro-optical element and the micro-substrate surface is a first micro-substrate surface and the micro-optical component further comprises a second micro-optical element disposed on a second micro-substrate surface of the micro-substrate opposite the first micro-substrate surface, wherein the second micro-substrate and the second micro-optical element disposed on the second micro-substrate surface are unitary, monolithic, and comprise a common material, and wherein the second micro-optical element extends away from and beyond the micro-substrate surface in a direction orthogonal to the micro-substrate surface.

22. The micro-optical component according to claim 17, wherein the system substrate has a cavity and the micro-optical component is disposed at least partially in the cavity, the micro-optical element is disposed at least partially in the cavity, the micro-optical element is disposed entirely in the cavity, the micro-optical element is disposed above the cavity, the system substrate comprises a wave guide, or any combination of these.

* * * * *